US009441811B2

(12) United States Patent
Lamvik et al.

(10) Patent No.: US 9,441,811 B2
(45) Date of Patent: Sep. 13, 2016

(54) LIGHTING DEVICES UTILIZING OPTICAL WAVEGUIDES AND REMOTE LIGHT CONVERTERS, AND RELATED METHODS

(75) Inventors: Michael Lamvik, Durham, NC (US); James Lynn Davis, Holly Springs, NC (US); Brent Thomas Ward, Cary, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 561 days.

(21) Appl. No.: 13/817,903

(22) PCT Filed: Aug. 19, 2011

(86) PCT No.: PCT/US2011/048456

§ 371 (c)(1),
(2), (4) Date: May 30, 2013

(87) PCT Pub. No.: WO2012/024607

PCT Pub. Date: Feb. 23, 2012

(65) Prior Publication Data

US 2013/0241435 A1    Sep. 19, 2013

Related U.S. Application Data

(60) Provisional application No. 61/375,589, filed on Aug. 20, 2010.

(51) Int. Cl.
  *G05F 1/00*    (2006.01)
  *F21V 9/08*    (2006.01)
  (Continued)

(52) U.S. Cl.
  CPC .. *F21V 9/08* (2013.01); *F21S 8/02* (2013.01); *F21V 9/16* (2013.01); *F21V 29/507* (2015.01);
  (Continued)

(58) Field of Classification Search
  None
  See application file for complete search history.

(56) References Cited

U.S. PATENT DOCUMENTS 3,928,757 A    12/1975  Nelson
4,853,594 A     8/1989  Thomas
(Continued)

FOREIGN PATENT DOCUMENTS

AT    DE102005030374 A1    1/2007
NL    WO2008149250 A1    12/2008
(Continued)

OTHER PUBLICATIONS

International Preliminary Report on Patentability dated Mar. 7, 2013 for PCT/US2011/048415.
(Continued)

*Primary Examiner* — Cassandra Cox
(74) *Attorney, Agent, or Firm* — Olive Law Group, PLLC; David P. Gloekler

(57) ABSTRACT

A lighting device (100) includes a housing (104), a light converter (136), one or more light sources (132), and one or more optical waveguides (160). The housing includes a light exit (124) for outputting a combination of primary light (140) and secondary light (156,158). The light source emits a primary light beam of a primary wavelength. The optical waveguide includes an input end (162) optically coupled to the light source, and an output end (164) facing a housing interior (108) and positioned at an angle to an axial direction through the housing interior. The optical waveguide directs the primary light beam from the light source, through the housing interior and toward a luminescent material of the light converter. The luminescent material emits secondary light of one or more wavelengths different from the primary wavelength in response to excitation by the primary light beam. The light source may be mounted outside the housing interior so as not to obstruct light propagation.

26 Claims, 10 Drawing Sheets

(51) Int. Cl.
*F21S 8/02* (2006.01)
*G02B 27/09* (2006.01)
*H05B 33/08* (2006.01)
*F21V 29/507* (2015.01)
*F21V 29/70* (2015.01)
*F21V 9/16* (2006.01)
*F21K 99/00* (2016.01)
*F21Y 101/02* (2006.01)
*F21V 8/00* (2006.01)
*F21V 29/74* (2015.01)

(52) U.S. Cl.
CPC ........... *F21V 29/70* (2015.01); *G02B 27/0994* (2013.01); *H05B 33/0857* (2013.01); *F21K 9/54* (2013.01); *F21V 29/74* (2015.01); *F21Y 2101/02* (2013.01); *G02B 6/0008* (2013.01)

(56) References Cited

U.S. PATENT DOCUMENTS

| | | | |
|---|---|---|---|
| 5,892,621 A | 4/1999 | McGregor et al. | |
| 5,998,925 A | 12/1999 | Shimizu et al. | |
| 6,357,889 B1 | 3/2002 | Duggal et al. | |
| 6,465,951 B1 | 10/2002 | Krafcik et al. | |
| 6,641,287 B2 | 11/2003 | Suehiro | |
| 6,737,681 B2 | 5/2004 | Koda | |
| 7,014,336 B1 | 3/2006 | Ducharme et al. | |
| 7,070,300 B2 | 7/2006 | Harbers | |
| 7,144,131 B2 | 12/2006 | Rains | |
| 7,311,858 B2 | 12/2007 | Wang et al. | |
| 7,390,437 B2 | 6/2008 | Dong et al. | |
| 7,614,759 B2 | 11/2009 | Negley | |
| 7,618,157 B1 | 11/2009 | Galvez et al. | |
| 7,660,040 B2 | 2/2010 | Starry et al. | |
| 7,703,943 B2 | 4/2010 | Li et al. | |
| 7,703,945 B2 | 4/2010 | Leung et al. | |
| 7,750,359 B2 | 7/2010 | Narendran et al. | |
| 7,942,540 B2 | 5/2011 | Harbers et al. | |
| 7,942,556 B2 | 5/2011 | Harbers et al. | |
| 8,764,210 B2 | 7/2014 | Jonsson | |
| 9,074,751 B2 | 7/2015 | Son et al. | |
| 2004/0245912 A1 | 12/2004 | Thurk et al. | |
| 2005/0057145 A1 | 3/2005 | Shieh et al. | |
| 2005/0224998 A1 | 10/2005 | Andrady et al. | |
| 2005/0224999 A1 | 10/2005 | Andrady et al. | |
| 2006/0072314 A1 | 4/2006 | Rains | |
| 2006/0145123 A1 | 7/2006 | Li et al. | |
| 2006/0158090 A1 | 7/2006 | Wang et al. | |
| 2006/0203468 A1 | 9/2006 | Beeson et al. | |
| 2006/0228435 A1 | 10/2006 | Andrady et al. | |
| 2006/0261309 A1 | 11/2006 | Li et al. | |
| 2006/0262310 A1 | 11/2006 | Starry et al. | |
| 2006/0264140 A1 | 11/2006 | Andrady et al. | |
| 2006/0268544 A1 | 11/2006 | Rains, Jr. et al. | |
| 2007/0029526 A1 | 2/2007 | Cheng et al. | |
| 2007/0240346 A1 | 10/2007 | Li et al. | |
| 2008/0110342 A1 | 5/2008 | Ensor et al. | |
| 2008/0111472 A1 | 5/2008 | Liu et al. | |
| 2008/0113214 A1 | 5/2008 | Davis et al. | |
| 2008/0150556 A1 | 6/2008 | Han et al. | |
| 2008/0172197 A1 | 7/2008 | Skipor et al. | |
| 2008/0210953 A1 | 9/2008 | Ladstatter et al. | |
| 2008/0286856 A1 | 11/2008 | Park et al. | |
| 2008/0310158 A1 | 12/2008 | Harbers et al. | |
| 2009/0212695 A1 | 8/2009 | Kim et al. | |
| 2009/0251884 A1 | 10/2009 | Rains | |
| 2009/0273918 A1 | 11/2009 | Falicoff | |
| 2009/0296384 A1 | 12/2009 | Van De Ven et al. | |
| 2009/0320340 A1 | 12/2009 | Koren | |
| 2010/0020531 A1 | 1/2010 | Choi et al. | |
| 2010/0027293 A1 | 2/2010 | Li | |
| 2010/0031617 A1 | 2/2010 | Ensor et al. | |
| 2010/0032695 A1 | 2/2010 | Fellows-Demille et al. | |
| 2010/0033948 A1 | 2/2010 | Harbers et al. | |
| 2010/0102199 A1 | 4/2010 | Negley et al. | |
| 2010/0103678 A1 | 4/2010 | Van De Ven et al. | |
| 2010/0254115 A1 | 10/2010 | Wegh et al. | |
| 2010/0290222 A1 | 11/2010 | Pickard et al. | |
| 2011/0182056 A1 | 7/2011 | Trottier et al. | |
| 2013/0215599 A1* | 8/2013 | Davis et al. | 362/84 |

FOREIGN PATENT DOCUMENTS

| | | |
|---|---|---|
| WO | 2007130536 A2 | 11/2007 |
| WO | WO2007130536 A2 | 11/2007 |
| WO | WO2009032378 A2 | 3/2009 |
| WO | WO2009151515 A1 | 12/2009 |
| WO | WO2010120900 A1 | 10/2010 |
| WO | WO2011068682 A1 | 6/2011 |

OTHER PUBLICATIONS

International Search Report dated Feb. 13, 2012 for PCT/US2011/048415.
International Preliminary Report on Patentability dated Mar. 7, 2013 for PCT/US2011/048429.
International Search Report dated Dec. 27, 2011 for PCT/US2011/048429.
International Preliminary Report on Patentability dated Mar. 7, 2013 for PCT/US2011/048440.
International Search Report dated Aug. 14, 2012 for PCT/US2011/048440.
International Preliminary Report on Patentability dated Mar. 7, 2013 for PCT/US2011/048456.
International Search Report dated Feb. 15, 2012 for PCT/US2011/048456.
Bowers et al. Journal of the American Chemical Society vol. 127 (2005) pp. 15378-15379.
Quantum Dots Lend New Approach to Solid-State Lighting, Sandia National Laboratory press release Jul. 24, 2003.
Reply and Amendment regarding related U.S. Appl. No. 13/817,900, dated Dec. 15, 2014.
Non-final Rejection regarding related U.S. Appl. No. 13/817,896, dated Dec. 3, 2014.
Reply and Amendment regarding related U.S. Appl. No. 13/817,896, dated Mar. 16, 2015.
Non-final Rejection regarding related U.S. Appl. No. 13/817,900, dated Mar. 31, 2014.
Reply and Amendment regarding related U.S. Appl. No. 13/817,900, dated Feb. 15, 2014.
Final Rejection regarding related U.S. Appl. No. 13/817,900, dated Feb. 10, 2015.
Non-final Rejection regarding related U.S. Appl. No. 13/817,887 dated Oct. 22, 2015.
PCT Search Report regarding related PCT Application No. PCT/US2011/048456 dated Feb. 15, 2012.

* cited by examiner

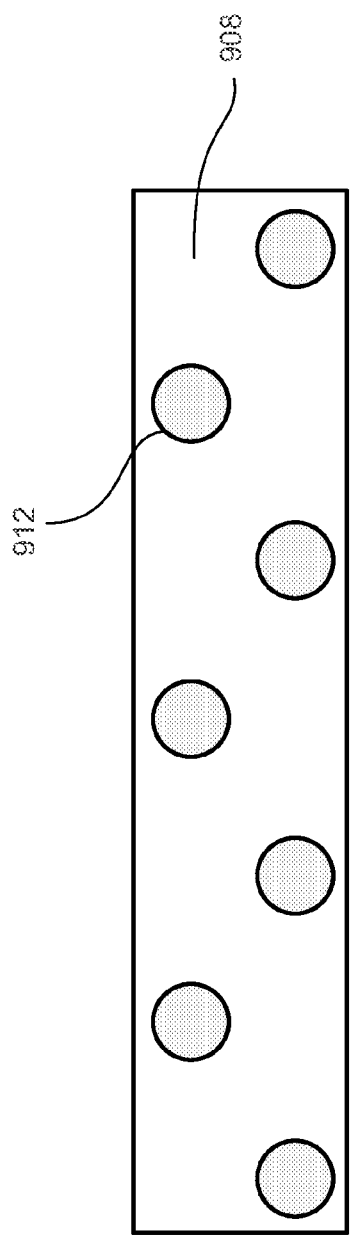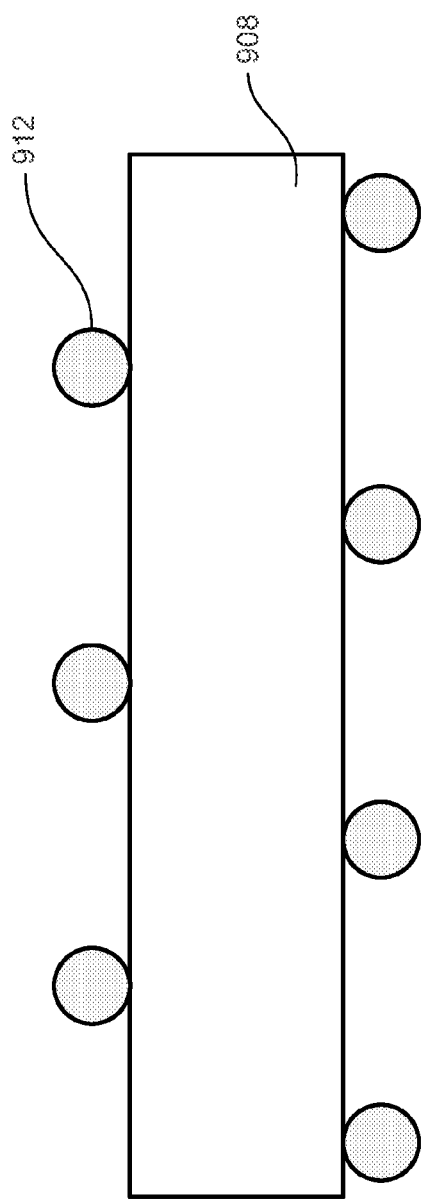
Fig. 9A
Fig. 9B

LIGHTING DEVICES UTILIZING OPTICAL WAVEGUIDES AND REMOTE LIGHT CONVERTERS, AND RELATED METHODS

RELATED APPLICATIONS

This application is the national stage of International Patent Application No. PCT/US2011/048456, filed Aug. 19, 2011, titled "LIGHTING DEVICES UTILIZING OPTICAL WAVEGUIDES AND REMOTE LIGHT CONVERTERS, AND RELATED METHODS", which claims the benefit of U.S. Provisional Patent Application Ser. No. 61/375,589, filed Aug. 20, 2010, titled "LIGHTING DEVICES UTILIZING OPTICAL WAVEGUIDES AND REMOTE LIGHT CONVERTERS, AND RELATED METHODS;" the contents of which are incorporated by reference herein in their entireties.

TECHNICAL FIELD

The present invention relates generally to lighting devices. In particular, the invention relates to lighting devices utilizing solid-state lighting sources, optical waveguides, and light converters.

BACKGROUND

For general purpose illumination requiring white light, solid-state lighting (SSL) devices are being investigated as alternatives to conventional lighting devices such as incandescent and fluorescent lighting devices. Incandescent lighting (IL) devices emit white light by thermal radiation from a hot, electrically resistive filament. The spectral quality and color-rendering accuracy of incandescent light is high, approaching the performance of an ideal black-body radiator. However, incandescent lighting suffers from very low energy efficiency and operating lifetimes, with most of the energy input being converted to heat rather than useful emission of visible light. Fluorescent lighting (FL) devices emit white light from phosphor-coated surfaces in response to irradiation of those surfaces by ultraviolet (UV) light generated from energized mercury vapor. Fluorescent lighting is more energy efficient and has higher operating lifetimes, but typically has poor spectral quality. Moreover, incandescent and fluorescent lighting require light bulbs that must remain sealed to maintain a vacuum or contain a gas, respectively, and are prone to breaking.

On the other hand, SSL devices do not require sealed bulbs, have robust designs that do not require flexible or fragile components, and are highly energy efficient. SSL devices typically utilize LED lamps that produce light in narrow ranges of wavelengths (e.g., red, green or blue). White light-emitting SSL devices have been provided in two different configurations. In one configuration, the white light-emitting SSL device utilizes a closely-spaced cluster of red, green and blue LEDs to produce white light from the spectral composite of emissions from the LEDs. This "RGB LED" configuration enables the color of the white light to be adjusted if the associated electronic circuitry is configured to enable adjustment of drive currents provided to (and thus adjustment of the intensities of) the individual LEDs. In another configuration, the SSL device utilizes a blue or UV LED packaged with one or more phosphors for converting the short-wavelength emission from the LED to longer-wavelength emissions, whereby white light is produced from the mixture of emissions in a manner similar to fluorescent lighting. Compared to RGB LED devices, the phosphor-converted LED approach can be lower in cost because it eliminates the need to control multiple different drive currents required for LEDs having active components of different compositions and spectral responses. However, the color of the output light produced by lighting devices utilizing phosphor-converted LED lamps typically is not adjustable. More generally, known designs for SSL device-based lighting devices have not provided sufficient high color rendering index (CRI) values and light distribution in comparison to IL and FL devices. Generally, conventional SSL lighting devices of any type typically exhibit CRI values of less than 80 and their ability to mix colors in a manner that produces pleasant color distribution has been poor. In addition, the typical design of a conventional SSL lighting device positions the LED and its attendant electrical connections and heat sink in a location that may occlude the output light, thereby reducing efficiency.

Because the human eye is very sensitive to small variations in color, the end user can sometimes detect variations in correlated color temperature (CCT) as small as 10-20 K. Hence, lighting devices must be held to tight specifications to avoid noticeable color variation in large installations. Variations in CCT and CRI typically arise in SSL lamps due to manufacturing variability and are manifested as visible color variations in lighting devices equipped with SSL lamps. Currently, there is no economical way to manufacture a large number of white lighting devices that output the same character (e.g., tone, hue, etc.) of white color. There is also no practical way to adjust output color of a lighting device once it has been manufactured. Consequently, a batch of manufactured SSL devices must be screened at the end of the manufacturing line (end of line, or EOL) and sorted into bins according to CCT, CRI and other properties. This process is known as "binning" and results in all lighting devices of a given bin having approximately the same color. Different bins may then be provided to different customers or for different lighting installation projects. Binning is disadvantageous because it adds time, effort and cost to the manufacturing process. Moreover, binning is an imperfect solution to the problem of color variation. Binning does not correct color variation but rather separates lighting devices with similar colors into different groups. Moreover, the variation in color among the lighting devices of a given bin may still be noticeable. For instance, a bin of lighting devices may be provided to a customer who then installs them as lighting fixtures in the ceiling of a large meeting room. Different persons in different areas of the room may notice non-uniformities in the light provided by the lighting fixtures due to the inadequacy of the binning process.

In addition, an end user may wish to adjust the tone or hue of the color provided by a lighting device. For example, in the case of a white lighting device the user may desire to adjust whether white light is warm (yellowish or reddish, e.g., CCT=2,600-3,700 K), neutral (e.g., CCT=3,700-5,000 K), or cool (bluish, e.g., CCT=5,000-10,000 K) for specific purposes such as general lighting in a relaxing environment, general lighting in an office environment, lighting for reading, etc. Also, the end user may be using a lighting device containing multiple lighting device units with respective SSL sources and light exits, or multiple lighting devices installed in the same location. In these latter cases, the end user may wish to adjust one or more lighting device units of a single lighting device, or one or more lighting devices grouped in close proximity, so that the light outputted by all lighting devices or lighting device units is uniform.

In view of the foregoing, there is a need for providing improved designs of SSL devices. Particularly there is a need for enabling tighter controls over the color of the light outputted by SSL devices, improving CRI values and uniformity in light distribution, and reducing the number of SSL devices that must be rejected as a result of binning operations.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one implementation, a lighting device includes a housing, a light converter, a light source, and an optical waveguide. The housing encloses a housing interior and includes a light exit for outputting a combination of primary light and secondary light. The light converter includes a luminescent material spaced from the light exit by a distance along an axial direction. The light source is mounted at the housing and is configured for emitting a primary light beam of a primary wavelength. The optical waveguide includes an input end optically coupled to the light source, and an output end facing the housing interior and positioned at an angle to the axial direction. The optical waveguide is configured for directing the primary light beam from the light source, through the housing interior and toward the luminescent material. The luminescent material is configured for emitting secondary light of one or more wavelengths different from the primary wavelength in response to excitation by the primary light beam.

According to another implementation, the light source is mounted outside the housing interior.

In some implementations, the housing includes an inside housing surface. The luminescent material may be located at an axial end of the inside surface opposite to the light exit. In other implementations, the luminescent material may be located in the housing interior and axially spaced from the axial end. The luminescent material may span an entire cross-section of the housing interior or a portion of the cross-section.

According to another implementation, the luminescent material is disposed on a reflective substrate that spans all or a portion of a cross-section of the housing interior. The luminescent material may cover the entire reflective substrate, or may cover a portion of the reflective substrate such that primary light is reflected from an uncovered portion of the reflective substrate.

According to another implementation, the lighting device includes a plurality of light sources and a plurality of optical waveguides. The light sources are mounted at the housing and are configured for emitting respective primary light beams. The optical waveguides include respective input ends optically coupled to the respective light sources, and respective output ends positioned at respective angles to the axial direction.

According to another implementation, the light converter includes a reflective section facing the housing interior, at least one of the optical waveguides is configured to direct a corresponding primary light beam to the reflective section, and at least one of the other optical waveguides is configured to direct a corresponding primary light beam to the luminescent material.

According to another implementation, the luminescent material includes a first luminescent section configured for emitting secondary light of a first wavelength, and a second luminescent section configured for emitting secondary light of a second wavelength different from the first wavelength, and at least one of the optical waveguides is configured to direct a corresponding primary light beam to the first luminescent section, and at least one of the other optical waveguides is configured to direct a corresponding primary light beam to the second luminescent section.

According to another implementation, the lighting device includes a reflective surface facing the housing interior. The reflective surface may be a diffusively reflective surface, a Lambertian surface, and/or a specularly reflective surface. The reflective surface may be a reflective paint, a distribution of reflective particles, a metal, a metal-inclusive compound, a metal-inclusive alloy, a ceramic, a glass, and/or a plurality of reflective nanofibers.

According to another implementation, a method is provided for producing output light from a lighting device. A primary light beam of a primary wavelength is generated from a light source mounted at a housing of the lighting device. The primary light beam is transmitted from the light source into an optical waveguide communicating with a housing interior enclosed by the housing. The primary light beam is emitted from the optical waveguide along a nominal output axis oriented at an angle to a central axis of the housing interior, wherein the primary light beam is directed through the housing interior and at least a portion of the primary light beam is incident on a luminescent material. Secondary light is emitted from the luminescent material through the housing interior, in response to excitation by the primary light beam, wherein the secondary light is emitted at one or more wavelengths different from the primary wavelength. Output light is outputted from a light exit communicating with the housing interior, wherein the output light comprises a combination of primary light and secondary light.

According to another implementation, the output light includes primary light reflected from a reflective surface in the housing interior, primary light reflected from the light converter, primary light reflected from a substrate supporting the luminescent material, and/or primary light transmitted through a substrate supporting the luminescent material.

According to another implementation, a plurality of primary light beams are generated from a plurality of respective light sources, transmitted from the light sources into a plurality of respective optical waveguides, and emitted from the optical waveguides along respective nominal output axes oriented at respective angles to the central axis.

According to another implementation, the light sources are positioned outside of the housing interior, and the primary light and secondary light propagate through the housing interior free of obstruction by any of the light sources.

According to another implementation, one or more of the primary light beams illuminate substantially all of a surface of the luminescent material facing the housing interior, or illuminate a portion of the surface.

According to another implementation, the output light is outputted at a color rendering index of 50 or greater.

According to another implementation, the primary light beam is emitted from a white light source, and the output light is outputted at a color rendering index higher than the color rendering index of the white light source.

According to another implementation, the output light has a correlated color temperature ranging from 2,500 to 5,500 K.

According to another implementation, the emitted primary light is white light and the output light is white light having a correlated color temperature different from the emitted primary light.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

FIG. 9A is a schematic view of an example of a luminescent fiber according to the present teachings.

FIG. 9B is a schematic view of another example of a luminescent fiber according to the present teachings.

DETAILED DESCRIPTION

Figure 1A:
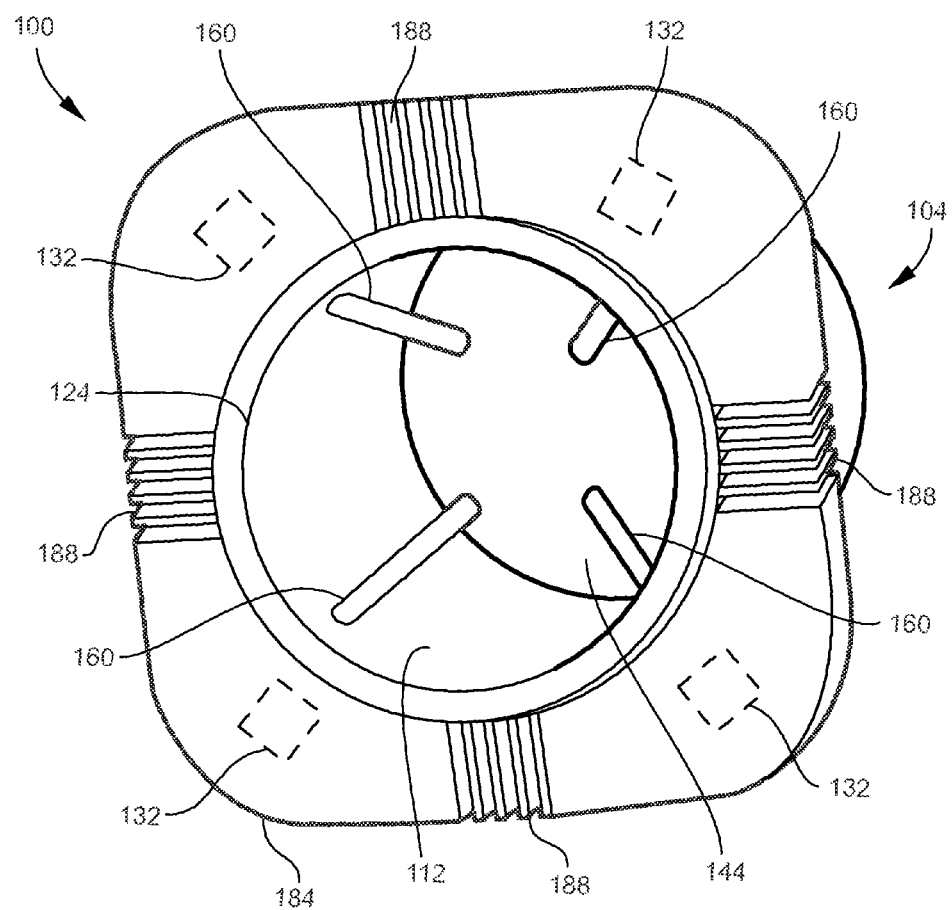
FIG. 1A is a perspective view of an example of a lighting device according to the present teachings.

As used herein, the term "nanofiber" refers to a typically solid structure that has one dimension (e.g., diameter) in the 10-2000 nm range, while the other dimension (e.g., length) may be quite long such as on the order of meters. Nanofibers may be made from a variety of materials, including polymers, ceramics, glasses, and sol gels, and blends of materials may also be readily fabricated. One feature of nanofibers is their small diameter relative to their length and consequently high surface area and aspect ratio (length: diameter). Nanofiber diameters on the order of visible light (about 380-760 nm) or even smaller may be readily produced, thereby creating very large surface areas.

As used herein, the term "luminescent particle" or "light-stimulable particle" refers generally to any photoluminescent (PL) particle. In typical implementations, the luminescent particles are capable of forming a composite with a suitable substrate, which may be amorphous, (poly)crystalline, or fibrous. As examples, the luminescent particles may be provided as one or more layers or regions on the substrate, as a distribution embedded in the substrate, as an interpenetrating network in the substrate, or as a distribution supported on or in fibers of the substrate. Examples of luminescent particles include quantum dots, phosphors, nano-phosphors, and organic dyes. While some luminescent particles may exhibit luminescent behavior by other mechanisms (e.g., electroluminescence), typical implementations taught herein rely principally on the photoluminescent response of particles. Accordingly, for convenience the terms "luminescent" and "PL" will be used interchangeably in the present disclosure in the context of particles or related materials that exhibit photoluminescence, without intending to exclude other types of luminescent activity.

As used herein, the term "quantum confined semiconductor particle" or "quantum dot" (QD) refers to a semiconductor nanocrystal-based material in which excitons are confined in all three spatial dimensions, as distinguished from quantum wires (quantum confinement in only two dimensions), quantum wells (quantum confinement in only one dimension), and bulk semiconductors (unconfined). A quantum dot may generally be characterized as a particle, the shape of which may be spherical, cylindrical, ellipsoidal, polygonal, or other shape. The "size" or "particle size" of the quantum dot may refer to a dimension characteristic of its shape or an approximation of its shape, and thus may be a diameter, a major axis, a predominant length, etc. The size of a quantum dot is on the order of nanometers, generally ranging from 1-1000 nm, but more typically ranging from 1-100 nm, 1-50 nm, 1-20 nm, or 1-10 nm. In a plurality or ensemble of quantum dots, the quantum dots may be characterized as having an average size. The size distribution of a plurality of quantum dots may or may not be monodisperse, but in some implementations may preferably be monodisperse through controlled synthesis so as to provide consistent light emission. The quantum dot may have a core-shell configuration, in which the nanocrystalline core and surrounding shell may have distinct compositions. The shell is typically an inorganic compound with a higher band gap than the core material. The shell may serve a function such as, for example, chemically stabilizing the core, isolating the core from the environment, etc. The optical properties of core-shell quantum dots are typically determined by their core. The quantum dot may also be capped with ligands attached to its outer surface (core or shell) or may otherwise be functionalized with certain chemical moieties for a specific purpose, such as providing compatibility with a solvent, serving as a surfactant to promote solution and prevent agglomeration, etc. Agglomeration may be disadvantageous for a number of reasons, including altering the emission characteristics to a degree noticeable by the human eye.

Quantum dots are advantageous because they function at temperatures that do not require an associated lighting device to provide temperature controlling means. Moreover, quantum dots may be produced utilizing relatively low-cost and easily implemented processing techniques, as known examples of solution-processed colloidal quantum dots. Furthermore, the quantum confinement results in many optical, electrical and chemical properties of the quantum dot (e.g., band gap) being strongly dependent on its size, and hence such properties may be modified or tuned by controlling the size of the quantum dot during synthesis. For example, two quantum dots having the same composition but different sizes may respectively emit photons at different wavelengths in response to the same stimulus. Generally, for many quantum dot compositions smaller sizes emit radiation at shorter wavelengths and larger sizes emit radiation at longer wavelengths. Some properties may also depend on the shape of the quantum dot. Accordingly, a combination of different quantum dots (different as to composition, size and/or shape) may be provided in a PL material to provide secondary light emission at two or more different wavelengths. Different quantum dots may be distributed as a mixture or may be partitioned into separate regions or zones on or in a substrate. Partitioning may be preferable for preventing absorption by one type of quantum dot of a photon emitted by another type of quantum dot, and/or for facilitating the color tuning techniques described below.

As used herein, the term "phosphor" refers to a luminescent particle typically composed of an inorganic host material (e.g., aluminum garnet, metal oxides, metal nitrides, metal oxynitrides, metal sulfides, metal selenides, metal halides, or metal silicates) that includes an activator (e.g., copper, silver, europium, cerium or other rare earth metals). Typically, the activator is added as a dopant. Within the host material, the activators function as centers of luminescent emission. Typically, the size of a phosphor particle is 1 μm or greater. The term "nano-phosphor" refers to a phosphor having a particle size of 100 nm or less. Nano-phosphors often have similar chemistries as the larger-size phosphors but scatter light to a lesser degree due to their smaller size. As nano-particles, nano-phosphors may have various attributes similar to those of quantum dots.

As used herein, the term "reflective" means that a given material (whether a surface or a bulk region of the material) reflects greater than 80% of incident light of a given wavelength or wavelengths. The term "transparent" or "light-transmitting" means that a given material is able to efficiently pass greater than 50% of incident light of a given wavelength or wavelengths. Unless specified otherwise, the term "transparent" or "light-transmitting" encompasses the terms "partially transparent" and "translucent."

For purposes of the present disclosure, the spectral ranges or bands of electromagnetic radiation are generally taken as follows, with the understanding that adjacent spectral ranges or bands may be considered to overlap with each other to some degree: Ultraviolet (UV) radiation spans the range of about 10-400 nm, although in practical applications (above vacuum) the range is about 200-400 nm. Visible radiation spans the range of about 380-760 nm. Violet radiation spans the range of about 400-450 nm. Blue radiation spans the range of about 450-490 nm. Green radiation spans the range of about 490-560 nm. Yellow radiation spans the range of about 560-590 nm. Orange radiation spans the range of about 590-635 nm. Red radiation spans the range of about 635-700 nm.

In the present context, the term "color" refers to the appearance of emitted light as perceived by the human eye. Color may be described by a measurable property (or "color parameter") of the light such as, for example, color rendering index (CRI), correlated color temperature (CCT), chromaticity coordinates (x,y), (u,v) or (u',v'), and distance from Plankian locus ($D_{uv}$), as may be defined by CIE (International Commission on Illumination) standards. The CRI is a measure of the ability of a white light source to faithfully reproduce the color appearance of objects in comparison to a reference light source such as a black-body radiator or daylight. The general color rendering index adopted by CIE, designated $R_a$, is typically utilized. The CRI of an ideal reference source having a balanced spectral power distribution (SPD) is defined as 100. Hence, high CRI values are desirable for actual light sources, for example greater than 80 for interior lighting. The color temperature of a light source emitting light of a given hue corresponds to the temperature (in degrees Kelvin) of an ideal black-body radiator emitting light of a comparable hue. However, black-body radiators emit light by thermal radiation while light sources such as SSL lamps primarily emit light by non-thermal mechanisms. Therefore, for these types of light sources a correlated value (CCT) is utilized as an approximation. Higher color temperatures (5,000K and above) are termed "cool" colors and appear bluish, while lower color temperatures (2,700-3,000K) are termed "warm" colors and appear yellowish to reddish. Intermediate color temperatures may be termed "neutral" colors. Warmer colors are often utilized for illuminating public areas to promote relaxation, while cooler colors are often utilized in office areas to promote concentration. All color temperatures visible to the average human eye (i.e., the gamut of human vision) may be shown, in color, in the color space of the CIE 1931 (x,y) chromaticity diagram (see, e.g., FIG. 8), the CIE 1960 (u,v) uniform chromaticity space (UCS) diagram, or the CIE 1976 (u',v') uniform chromaticity scale (UCS) diagram. Except for brightness, a color may be described by its chromaticity, i.e., its x-y or u-v coordinate position on a chromaticity diagram. A chromaticity diagram may also show the Planckian locus, which is the path taken through the color space by a black-body radiator as its temperature changes. In a direction from lower to higher color temperature, the Planckian locus runs from deep red through orange, yellowish white and white, to bluish white. The distance of a color's coordinate position from the Planckian locus may be utilized to calculate CRI and CCT. The CIE (u,v) or (u',v') diagram is typically utilized to calculate distance from the Planckian locus. CIE (x,y) coordinates may be converted to CIE (u,v) or (u',v'), coordinates utilizing known transformations.

As described by way of examples below, lighting devices (i.e., luminaires or light fixtures) are provided that are capable of producing white light of any desired color (i.e., shade of white) or any desired non-white color (e.g., red, green, yellow, blue, etc.). Light outputted from a lighting device will be referred to as "output light." A lighting device as disclosed herein may be configured to produce output light according to any desired color parameter or parameters such as, for example, spectral power distribution (SPD), CRI, CCT, chromaticity coordinates, and distance from Plankian locus. The lighting device may be configured for any general or architectural lighting purposes, and may be utilized as a replacement for conventional lighting devices such as IL and FL devices. In comparison to known SSL lighting devices, the lighting device as disclosed herein may provide superior output light distribution and color quality. In some implementations, the color of the output light may be adjustable or tunable. Color tuning may be done for any purpose. As examples, an end user may desire to adjust the output of a single lighting device (e.g., to render white light wanner, cooler, or more neutral) or, in the case of a set of lighting devices, to adjust the output of one or more of the lighting devices to achieve a consistent appearance from the lighting devices. As another example, a manufacturer may desire to adjust one or more lighting devices at the end of the manufacturing line (EOL) to reduce or eliminate any variability in light output from a batch of manufactured lighting devices.

In some implementations taught in the present disclosure, a lighting device includes one or more primary light sources, one or more light converters (or "secondary converters"), one or more optical waveguides (or "light guides") for directing primary light beam(s) from the primary light source(s) toward the light converter(s), and a housing. The lighting device may also include one or more reflective materials (or reflectors).

The primary light source may be any suitable light source for generating a beam of primary light (or excitation light, or pump light) and directing the beam through an interior of the housing toward the light converter. In this context, primary light is electromagnetic radiation propagating at any desired wavelength (visible or non-visible) that is sufficient to induce emission from the light converter of electromagnetic radiation at one or more wavelengths different from the primary (or excitation, or pump) wavelength and within the visible spectrum. This type of emission will be referred to as secondary light or secondary emission. In typical implementations, the primary light source is configured for emitting radiation of relatively short wavelengths such as UV, violet or blue. No specific limitation is placed on the type of primary light source, although in typical examples the primary light source is an electroluminescent (EL) device such as a laser diode (LD) or more typically a light-emitting diode (LED). In the context of lighting applications, an EL device may be referred to as a solid-state lighting (SSL) lamp or SSL device. An LED (or other EL device) may be based on a conventional system of inorganic semiconductor materials such as Group III (m, Al, Ga) nitrides, or may be an organic LED (OLED), a polymer LED (PLED), or a hybrid design utilizing both inorganic and organic components.

The light converter may be any luminescent material, or any structure that includes a luminescent material, capable of emitting secondary light in response to excitation by the incident primary light beam. As noted above, the luminescent material is typically a photoluminescent (PL) material. Typically, emission of secondary light from a PL material occurs through the mechanism of fluorescence. Depending on the type of PL material utilized, the secondary wavelength may be shorter or longer than the primary wavelength. Typically, the PL material is configured to emit a longer wavelength as short-wavelength light sources are readily available and shorter-to-longer wavelength conversions tend to be more efficient. The PL material may include two or more different types of PL materials configured to emit secondary light at two or more respective wavelengths in response to excitation by the incident primary light beam. For example, the PL material may include both red-emitting and green-emitting PL materials, which in some implementations may be utilized in conjunction with a blue, violet or UV light source to produce white light. In some implementations, the PL material includes a plurality of luminescent (or light-stimulable) particles supported by a substrate. In this context, "supported by" means that the luminescent particles are encapsulated or embedded in the substrate and/or disposed on the substrate in a stable manner. The luminescent particles may be QDs, phosphors, nano-phosphors, organic dyes, or a combination of two of more of the foregoing. Color parameters such as CCT may be controlled by controlling the quantity of luminescent particles over a unit area of the PL material (i.e., density), the thickness of a layer of luminescent particles, the composition of the luminescent particles, etc. Different types of luminescent particles may be utilized simultaneously. As one example, a PL material may include one or more sections of green-emitting phosphors and one or more sections of red-emitting QDs. Different sections of different PL materials may be spatically separated from each other to limit secondary absorption. Additionally, the light converter may include a reflective material, examples of which are described below.

In various implementations, the light converter may be positioned remotely from the light source. By this configuration, luminescence occurs over a large surface area resulting in improved uniformity in color, and thermal degradation by heat generated from the light source is reduced or eliminated. The light converter may be rigid or flexible.

The substrate of the PL material may be selected based on its light-transmission and/or light-reflection properties. Examples of substrates include, but are not limited to, various polymers, ceramics, glasses, and natural and synthetic papers such as PolyArt® papers or other types of cellulosic materials. Light reflection may be imparted to certain types of substrates by introducing features with dimensions on the order to the wavelength of light. Such features, typically 100 nm to 800 nm in size, promote scattering of a light beam thereby increasing the reflection coefficient. Examples include etched glasses and polymers. In some implementations, the PL material is a photoluminescent nanofiber (PLN) structure that includes one or more types of luminescent particles supported on a substrate formed from nanofibers (e.g., a nonwoven mat), as described in more detail below.

The optical waveguide is optically interposed between the light source and the PL material of the light converter. The optical waveguide may be any structure capable of being optically coupled to the light source in an acceptably lossless matter, and which is configured to efficiently collect and guide photons of the primary light beam toward the PL material. Various types of optical waveguides may be utilized, including but not limited to light pipes, slabs, photonic crystals, and prismatic structures configured for bending the path of incident light without dispersing the light into constituent spectral components. A light pipe may be an optical fiber of conventional design, or may be a photonic-crystal fiber configured to efficiently pass light at the primary wavelength. A photonic-crystal fiber is typically constructed of a glass such as silica glass, and may include a solid or hollow core surrounded by a micro-structured or nano-structured cladding having a periodicity of high- and low-dielectric constant materials scaled appropriately for transmission of the primary wavelength of interest.

The housing generally may be any structure suitable for containing visible electromagnetic radiation during optical processing of the radiation by the lighting device and prior to output of the radiation from the lighting device. In particular, the housing may be any structure that provides an interior or cavity suitable for mixing (or combining) primary light components and secondary light components, and a light exit or aperture through which the mixed (or composite) light emanates to the ambient environment outside the lighting device. Additionally, the housing may serve as a structure for mounting or supporting one or more other components of the lighting device. The light exit may be an uncovered opening or may include a light-transmitting structure that spans the opening. The light-transmitting structure may serve to protect components residing in the housing interior from the ambient environment. Additionally, the light-transmitting structure may be or include an optical component configured to perform an optical processing function on the output light, such as promoting the mixing or diffusion of the primary and second light components, focusing the output light as a beam (e.g., a lens). It will be noted that lighting devices as taught herein do not require color filters.

A reflective material may be mounted in a suitable location in the housing interior or may be integrated with the housing. For example, the reflective material may line an inside surface of the housing that bounds all or a portion of the housing interior. The reflective material may be a structure that is inherently reflective throughout its bulk, or may be a reflective surface or outer region of a structure, or may be a reflective coating applied to a structure. The reflective material may be a specular reflector such as, for example, a layer or silver (Ag) or aluminum (Al). The reflective material may alternatively be a diffuse reflector such as, for example, a white paint or ink, a non-woven fabric, or a non-woven fabric to which a white paint or ink has been applied. In some implementations, the reflective material is a non-woven mat or substrate formed from a plurality of nanofibers and is highly diffusive. The nanofiber substrate may be the same type of structure as the above-noted substrate utilized to create a PL material. A nanofiber substrate or other type of diffuse reflector may perform as a Lambertian reflector, whereby the brightness of the light scattered from the surface appears to an observer to be the same regardless of the observer's angle of view relative to the surface.

The color of the output light produced by the lighting device depends on the composition of the wavelengths at which the output light is emitted from the light exit of the lighting device. The wavelength composition in turn depends on the wavelengths of light respectively emitted by the light source and the light converter as well as on how the various paths of light components are manipulated or processed (e.g.; modulated, reflected, steered, combined, etc.) within the housing interior. The output light may fall primarily within a wavelength band associated with a particular color, or may be a broad-spectrum white light. The lighting device in some implementations produces white light having a CRI of greater than 70, while in other implementations produces white light having a CRI of greater than 80 or greater than 90. These high CRI values may be achieved with the use of either a short-wavelength light source (e.g., UV, violet, or blue) or a white light source (e.g., a white LED) in combination with PL materials emitting secondary light of selected wavelengths. When a white LED is utilized as the light source, the lighting device is able to significantly improve the CRI of the white LED, in some implementations by as much as 35%. In one example, the CRI value of a white LED is raised from 67 to 90, representing a significant improvement in color rendering properties of the light source. In various implementations, the output light has a CCT ranging from 2,500 to 5,500 K, and the output light of the lighting device may be tunable over this range.

Figure 1B:
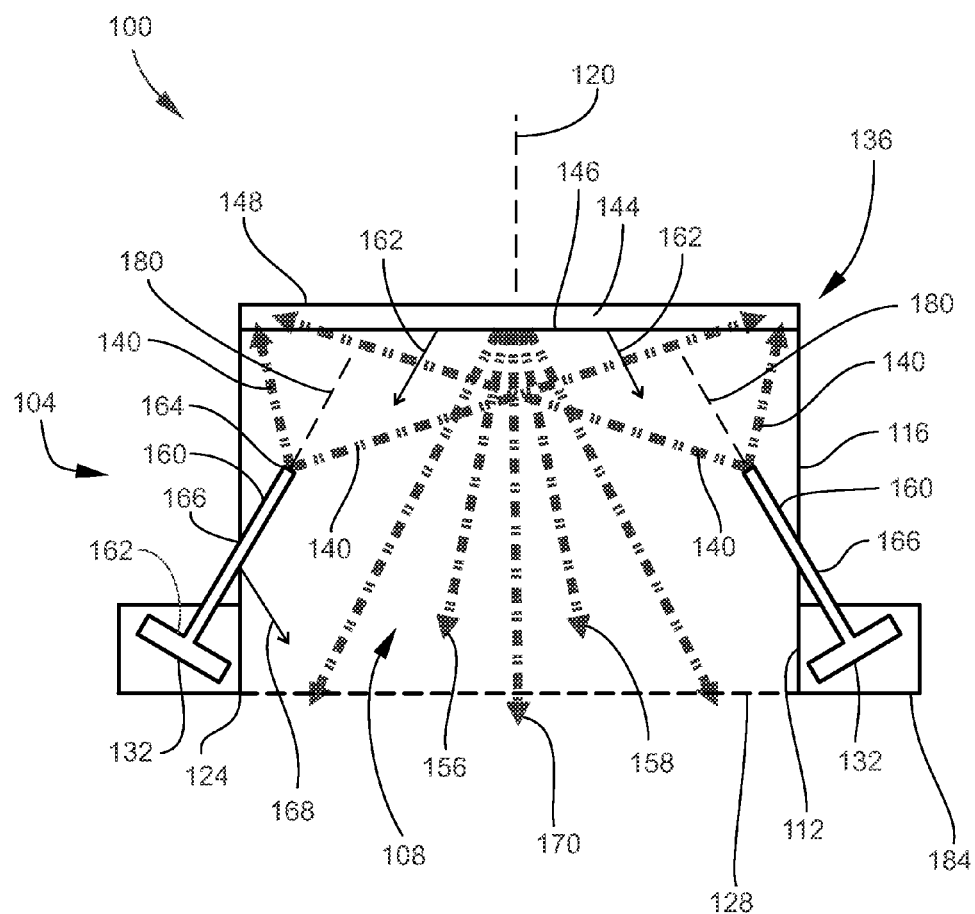
FIG. 1B is a cross-sectional view of the lighting device illustrated in FIG. 1A.

FIG. 1A is a perspective view of an example of a lighting device 100 according to the present teachings, and FIG. 1B is a cross-section view of the lighting device 100. The lighting device 100 includes a housing 104 surrounding a housing interior 108 and a reflective surface 112 disposed in the housing interior 108. In the present example, the housing 104 includes a substrate 116 and the reflective surface 112 is disposed on the substrate 116 whereby the housing interior 108 serves as a reflective cavity. The housing substrate 116 may have any suitable composition. In the present example, the housing substrate 116 is a polymer such as polyvinyl chloride (PVC). Also in the present example, the reflective surface 112 is a diffusive reflective surface and may perform as a Lambertian reflector for the wavelengths at which light components propagate in the housing interior 108. In one specific example, the reflective surface 112 is implemented as one or more layers of highly diffusive nanofibers as described further below. Alternately, the reflective surface 112 may be substantially specular. Generally, the housing 104 (or at least its inside surface) and the reflective surface 112 may have any shape, but advantageously have a shape that promotes distribution and reflection of light components. In the present example, the housing 104 has an axial configuration by which at least the inside surface of the housing 104 is coaxial and symmetrical with a central axis 120. For instance, the housing 104 or its inside surface may be cylindrical. As one example, this type of configuration may be useful when implementing the lighting device 100 as a downlight device that is recessed into a ceiling structure or other structure. The housing 104 includes a light exit 124 at one axial end. The light exit 124 may be covered with a light-transmitting structure 128 as noted above.

The lighting device 100 further includes a primary light source 132, a light converter 136, and an optical waveguide 160. In FIG. 1B, the primary light source 132 also schematically represents circuitry or means provided for powering and controlling the type of light source 132 utilized. For simplicity, the source of electrical power (e.g., a line voltage connection) and associated wiring to the light source 132 are not shown. The light source 132 is configured to generate and emit a primary light beam at a primary wavelength $\lambda_{em}$ which in FIG. 1B is schematically represented by arrows 140. The light source circuitry may be configured to enable adjustment of the drive current to the light source 132 and thus adjustment of the intensity of the primary light beam 140. In some implementations, the light source 132 is an LED. For example, the light source 132 may be a high-brightness LED such as one from the XLamp® XR-E series commercially available from Cree, Inc., Durham, N.C. In the present implementation the primary light beam 140 may have either a wide or narrow angle of divergence (e.g., cone-shape). In either case the photons of the primary light beam 140 are collected by the optical waveguide 160.

The optical waveguide 160 generally includes an input end 162 and an output end 164. The input end 162 is optically coupled to the light source 132 by any suitable means that minimizes or eliminates loss of electromagnetic energy. For example, the input end 162 may be bonded to the light source 132 by an optical adhesive, or fused to the light source 132, and/or may be coated with a coating that matches the coating (e.g., silicone) of the light source 132 to maximize transfer of light into the optical waveguide 160. Depending on the angle of divergence of the light beam 140 outputted from the light source 132, a collimating lens (not shown) may be interposed between the light source 132 and the input end 162. In some implementations, the input end 162 may surround the light source 132 and may be shaped to collect emitted light effectively into the optical waveguide 160. To facilitate collecting light from the light source 132, the optical waveguide 160 may include one or more reflective surfaces at the input end 162. The body of the optical waveguide 160 may be straight or may be bent or curved. The output end 164 faces the housing interior 108. By this configuration, the optical waveguide 160 establishes a light path whereby the light beam 140 generated by the light source 132 is guided through the optical waveguide 160, is emitted from the output end 164, and propagates through the housing interior 108 toward the light converter 136. Depending on the design of the optical waveguide 160, the optical waveguide 160 may be flush with an interior surface of the housing 104 (or with a reflective surface 112 lining the interior surface), or may extend through a bore 166 of the housing 104 into the housing interior 108 as best shown in FIG. 1B. The optical waveguide 160 or at least its output end 164 may be oriented at an angle to the central axis 120, as also shown in FIG. 1B.

In the present example, the lighting device 100 includes four light sources 132 and corresponding optical waveguides 160, only two of which are shown in FIG. 1B. The light sources 132 and optical waveguides 160 are circumferentially arranged about the central axis 120, and may or may not be equally spaced from each other depending on the configuration of the light converter 136. It will be appreciated that the number of light sources 132 and optical waveguides 160 may be less than or greater than four.

For purposes of description, each optical waveguide 160 or at least its output end 164 may be characterized as lying on a nominal output axis 180. The nominal output axis 180 is generally an axis projecting from the output end 164 directly to the light converter 136 in a straight line, and depicts the general or resultant direction in which the primary light beam 140 is aimed toward the light converter 136. This output axis 180 is "nominal" in the sense that the primary light beam 140 is not necessarily so coherent as to be constrained to the immediate vicinity of the output axis 180. The optical waveguide 160 may be configured such that the primary light beam 140 diverges at a wide enough angle to irradiate all or substantially all of the side of the light converter 136 facing the housing interior 108, or alternatively only a desired portion of the light converter 136. In the example illustrated in FIG. 1B, the primary light beam 140 from each optical waveguide 160 irradiates all or substantially all of the light converter 136. Depending on the scale of the lighting device 100 and the axial distance between output end 164 and the light converter 136, a portion of the primary light beam 140 from one or more of the optical waveguides 160 may be directly incident on the reflective surface 112 instead of on the light converter 136.

In the present example, the light sources 132 are located so as to direct the respective primary light beams 140 into the optical waveguides 160 without obstructing the propagation of light components through the housing interior 108. For this purpose, the light sources 132 may be mounted to a portion of the housing 104 such as the housing substrate 116, or may be suspended at positions outside the housing interior 108 by any suitable means. In the specific example illustrated in FIGS. 1A and 1B, the light sources 132 are mounted to an annular or flanged structure 184 of the housing 104 located outside the housing interior 108. The annular structure 184 may include individual heat sinks to which the respective light sources 132 are mounted, or may be configured as a common heat sink for all light sources 132 provided. In all such cases, the light sources 132 do not obstruct any portion of the housing interior 108. To facilitate the offset arrangement of the light sources 132, the optical waveguides 160 may be oriented such that their nominal output axes 180 are at an angle to the central axis 120. The light sources 132 may be axially interposed between the light exit 124 and the light converter 136. Alternatively, the light sources 132 may be axially located at or proximate to the light exit 124. In the present example, the annular structure 184 and thus the light sources 132 are located at the light exit 124. By this configuration, the annular structure 184 may also be utilized as a mounting component for the lighting device 100, particularly in recessed mounting applications. The annular structure 184 may also include one or sets of cooling fins 188 to provide additional heat transfer.

In the illustrated example, the light converter 136 is mounted at the opposite axial end of the housing 104. Alternatively, the light converter 136 may be mounted within the housing interior 108. The opposite axial end of the housing may include a structure 148 that is (or is covered by) a reflective surface similar to the reflective surface 112 located at the inside housing surface in this example. The light converter 136 includes a PL material 144. At least one luminescent surface or side 146 of the PL material 144 faces the housing interior 108. Depending on its design, the PL material 144 may be supported on or embedded in a suitable substrate to form one or more layers of PL material 144, and/or specifically sized and shaped sections of PL material 144, on the luminescent surface 146. The light converter 136 may be configured to be removable from the lighting device 100 such that the light converter 136 can be replaced with another light converter of the same or different configuration of PL materials 144. The substrate of the PL material 144 may be reflective. In advantageous implementations, the substrate of the PL material 144 and/or the axial end-located structure 148 (if provided) may be diffusively reflective to an appreciable degree so as to promote distribution and mixing of primary light and secondary light in the housing interior 108. Alternatively, particularly in implementations in which the light converter 136 is mounted within the housing interior 108 at a distance from the axial end, the substrate of the PL material 144 may be at least partially light-transmitting, in which case some components of primary light and secondary light may be emitted from the back side of the light converter 136 and reflected by a reflector located at the axial end (such as the structure 148). Moreover, the PL material 144 may span the entire cross-section of the axial end of the housing 104 as shown in FIG. 1B, or alternatively may span only a portion of the cross-section, in which case some of the primary light 140 emitted from the optical waveguide(s) 160 may bypass the PL material 144 and be reflected from a reflective surface in the housing interior 108.

As described further in examples below, the light converter 136 may include a combination of two or more different types of PL materials 144, e.g., a first PL material and a second PL material, which emit secondary light at two respective wavelengths $\lambda_1$ and $\lambda_2$ as schematically represented by respective arrows 156, 158 in FIG. 1B. The different PL materials 144 may be arranged in a desired pattern. Some of the primary light incident on the PL materials 144 may not excite a fluorescent or wavelength-shifting response (i.e., not cause re-emission at a different wavelength) and instead is reflected back from the light converter 136. This "unconverted" primary light is schematically represented by other arrows 162 in FIG. 1B.

In operation, activation of the lighting device 100 entails providing power to each light source 132 to energize its light-emitting components. In response, each light source 132 generates a respective primary light beam 140, which is directed through the corresponding optical waveguide 160 toward the light converter 136. All or a portion of each primary light beam 140 is directly incident on the PL materials 144, i.e., reaches the PL materials 144 without first encountering any other component in the housing interior 108. Another portion of the primary light beam 140 may be directly incident on the reflective surface 112. Depending on the diffusivity of the reflective surface 112, some of the primary light striking the reflective surface 112 may then be reflected toward the PL materials 144, while another portion of the primary light striking the reflective surface 112 may be reflected toward the light exit 124 as schematically represented by an arrow 168. As regards the primary light striking the PL materials 144, whether directly from the light source 132 (e.g., arrow 140) or as a result of reflection from the reflective surface 112, a portion of this incident primary light is converted to secondary light 156, 158 while another portion remains unconverted (162). Components of the unconverted primary light 162 reflected from the PL materials 144, the primary light reflected from the reflective surface 112 without having first struck the PL materials 144, and the secondary light 156, 158 generated by photoluminescence may propagate in different directions through the housing interior 108 and may be reflected one or more times by the reflective surface 112. A mixture of these components passes through the light exit 124 as output light, as schematically represented by an arrow 170. The output light 170 comprises an ensemble of the primary and secondary wavelengths of electromagnetic radiation ($\lambda_{em}+\lambda_1+\lambda_2$), and this composition of wavelengths determines the perceived color of the output light 170. The lighting device 100 is structured such that the optical mixing of the different light components ($\lambda_{em}+\lambda_1+\lambda_2$) is sufficient to produce output light 170 of a desired color having a highly uniform appearance. It will be understood that all arrows depicting light components in FIG. 1B have been arbitrarily positioned for illustrative purposes.

As one non-limiting example, the light source 132 may be a short-wavelength emitter such as a blue emitter (e.g., $\lambda_{em}$ ~450 nm), a first PL material of the light converter 136 may be an intermediate-wavelength emitter such as a green emitter, and a second PL material of the light converter 136 may be a longer-wavelength emitter such as a red (or red-orange, or orange) emitter. This configuration results in the output light 170 being white (i.e., broadband visible light). In another example, the light source 132 may be a cool white emitter (typically a phosphor-converted "white" LED) and the PL material may be a red emitter. This configuration results in the output light 170 being warm white. In other implementations, the light converter 136 may include more than two different types of PL materials (e.g., red, orange and green emitters). The light converter 136 may also include regions in which the PL materials are absent but which reflect the incident primary light—in effect, the reflective regions add another emitter corresponding to the primary light wavelength (e.g., a blue emitter in the case where a blue light source 132 is utilized). As another example, the light source 132 may be a UV emitter (e.g., $\lambda_{em}$ ~350-370 nm) or a violet emitter (e.g., $\lambda_{em}$ ~408 nm), the first PL material may be a green or yellow emitter, the second PL material may be a red or orange emitter, and a third PL material may be a blue emitter, resulting in white output light 170.

As noted above, one or more of the light sources 132 may include circuitry or means for adjusting the intensity of the primary light beam 140 emitted from one or more of the light sources 132. It will be appreciated that when two or more different PL materials are provided with the light converter 136, the pattern of the PL materials may be arranged in a manner optimal for this type of color tuning, in view of the position of the primary light beam 140 relative to the PL materials. It will also be appreciated that the change in the color of the output light 170 is not limited to large chromatic shifts, such as from green to yellow or yellow to orange. In more typical implementations, the change in color is more in the nature of fine tuning, such as adjusting the amount of blue or red in the output light 170.

As an example contemplated for many lighting applications, the lighting device 100 may be configured to produce white output light 170. In this case, the drive circuitry may be utilized to adjust the relative amount(s) of blue, green and/or red in the white output light 170, thereby changing the whiteness (e.g., coolness, neutrality or warmth) of the output light 170.

Testing of prototypes of a lighting device similar to that illustrated in FIGS. 1A and 1B with a two-inch diameter light exit 124 has demonstrated a fixture efficiency of typically 0.74 when either white or blue LED sources were utilized. Fixture efficiency is defined as the luminous output of the device divided by the luminous output of the LED lamp by itself. The efficiency is expected to increase upon further refinement of the design, such as by eliminating light leakages at the junction of the light converter 136 and the housing 104. More generally, the design of the lighting device 100 enables a great amount of flexibility in the selection of the light sources 132, the optical waveguides 160, the PL materials 144, and other fabrication parameters.

Figure 2:
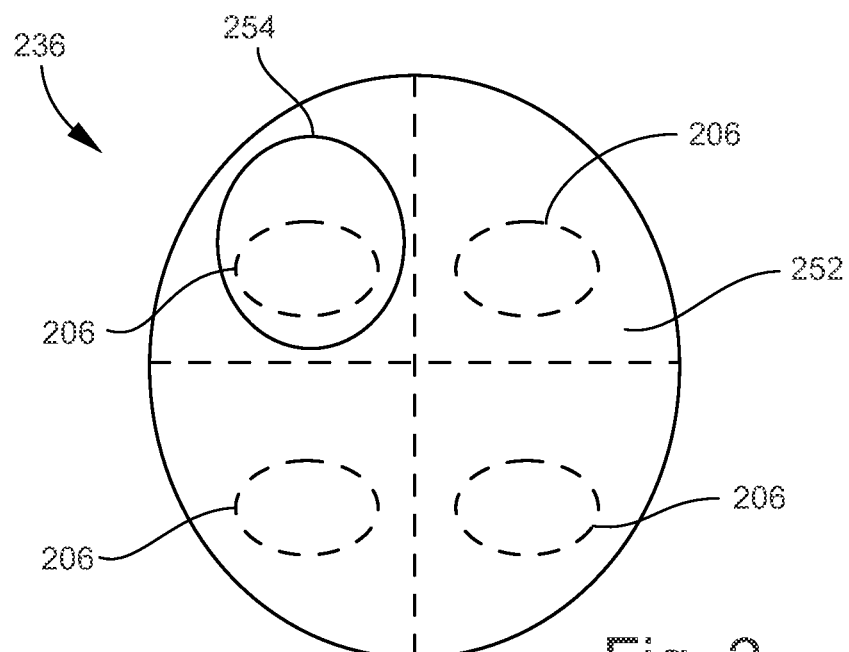
FIG. 2 is a plan view of an example of a light converter that may be utilized in a lighting device such as illustrated in FIGS. 1A and 1B, according to the present teachings.

FIG. 2 is a plan view of an example of a light converter 236 that may be utilized in conjunction with the lighting device 100 illustrated by example in FIGS. 1A and 1B or with other lighting devices. The light converter 236 includes a pattern of two different PL materials, i.e., a first PL material 252 and a second PL material 254. The pattern consists of a single section of the first PL material 252 covering a large area of the light converter 236 and a single section of the second PL material 254 covering a smaller area of the light converter 236. As one example, the first PL material 252 may be applied to the entire area of the light converter 236 and the second PL material 254 may subsequently be applied as a layer on a desired portion of the first PL material 252. When, for example, it is desired to produce white output light, the larger-area first PL material 252 may be configured to provide intermediate-wavelength emissions that balance the majority of the short-wavelength light incident on the light converter 236, while the smaller-area second PL material 254 is configured to provide a longer-wavelength emission that in effect fine-tunes the color temperature of the output light. Accordingly, in one example the first PL material 252 may be a green or yellow emitter and the second PL material 254 may be a red or orange emitter. As noted above, the optical waveguides 160 (FIG. 1B) may be configured such that each primary light beam 140 irradiates the entire area of the light converter 236. The second PL material 254 may be located and sized so as to obtain a desired amount of long-wavelength radiation in the output light.

Considering that the four primary light beams 140 in FIG. 1B are directed toward the light converter 236 at different angles, in some implementations one of the primary light beams 140 may illuminate the second PL material 254 with a higher flux than the other three primary light beams 140 and hence have a greater impact on the conversion of incident blue light into long-wavelength (e.g., red) light. In this case, the drive current fed to the light source 132 generating the higher-impact primary light beam 140 may be accurately adjusted so as to accurately adjust the amount of long-wavelength radiation in the output light 170.

As further illustrated in FIG. 2, the area of the light converter 236 may conceptually be partitioned into four quadrants. Continuing with the example of FIGS. 1A and 1B in which four light sources 132 and corresponding optical waveguides 160 are utilized, in some implementations each optical waveguide 160 may be aimed at a specific quadrant. Dashed ellipses in FIG. 2 depict central portions 206 of the respective primary light beams 140 illuminating respective quadrants. The size of the area of each central portion 206 depicted in FIG. 2 is arbitrary. The central portion 206 merely corresponds to the brightest area of illumination by the primary light beam 140. This is a result of the planar geometry of light converters such as shown in FIGS. 1A, 1B and 2. The radiant flux is typically highest in the vicinity of the nominal output axis 180 (FIG. 1B) along which the optical waveguide 160 is directly aimed at the light converters, and decreases with radial distance from the nominal output axis 180 due to the fall-off in emission intensity of a typical primary light source 132. Therefore, fluorescent interactions between the primary light beam 140 and the PL material 252 or 254 are likely to be more concentrated within the area of the central portion 206. However, the extent of spatial variation in radiant flux will depend on how much the optical waveguide 160 collimates the primary light beam 140. For a highly collimated light beam 140, the central portion 206 as illustrated may effectively represent all or most of the area of illumination by that light beam 140 on the light converter 236.

In the present example, it can be seen that the light source 132 aimed at the second PL material 254 may predominantly contribute to long-wavelength emissions from the light converter 236, while the other three light sources 132 aimed at different regions of the first PL material 252 may predominantly contribute to intermediate-wavelength emissions from the light converter 236. Moreover, as noted above the intensity of the primary light beam 140 originating from the light source 132 aimed at the second PL material 254 may be adjusted to adjust the amount of long-wavelength emissions relative to intermediate-wavelength emissions. Also, one or more of the light sources 132 aimed at the first PL material 252 may be adjusted to adjust the amount of intermediate-wavelength emissions relative to long-wavelength emissions.

In FIG. 2, the shape of the section containing the second PL material 254 is illustrated as being a circle. It will be appreciated, however, that this is one of many alternatives. The section of second PL material 254 may have any rounded or polygonal shape, or may fill a part of or the entire quadrant as a circular sector. The second PL material 254 may also extend into more than one quadrant.

Figure 3:
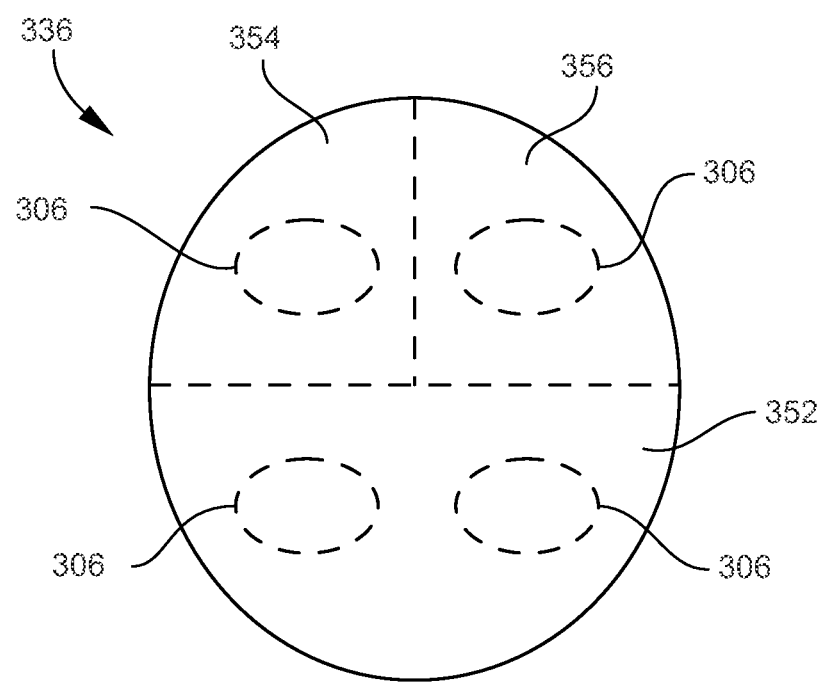
FIG. 3 is a plan view of another example of a light converter according to the present teachings.

FIG. 3 is a plan view of another example of a light converter 336 that may be utilized in conjunction with the lighting device 100 illustrated by example in FIGS. 1A and 1B or with other lighting devices. The light converter 336 includes a pattern in which the lower half of the light converter 336 is covered partially or entirely with a first material 352, the upper left quadrant is covered partially or entirely with a second material 354, and the upper right quadrant is covered partially or entirely with a third material 356. The pattern in this implementation includes three different PL materials, or alternatively two different PL materials and a reflective material. Thus, in one example, a yellow- or green-emitting first material 352 may be located at the lower half, a red-emitting second material 354 may be located at the upper left quadrant, and a green- or yellow-emitting third material 356 may be located at the upper right quadrant. In another example, the third material 356 located in the upper right quadrant may be configured to emit short-wavelength radiation, whether by secondary conversion of a shorter-wavelength primary light beam incident thereon or by reflection of the primary light beam. For example, in the case of UV or violet light sources 132, the third material 356 may be a blue-emitting PL material. In the case of blue light sources 132, the third material 356 may be a reflective material. The reflective material may be an area of a reflective substrate on which no PL materials are provided, as in the example of a bare region of a nanofiber substrate. Alternatively, the reflective material may be a layer of white reflective material that is applied to the substrate. Examples of applied reflective materials include, but are not limited to, particulate materials such as barium sulfate ($BaSO_4$), titanium (IV) oxide ($TiO_2$), alumina ($Al_2O_3$), zinc oxide (ZnO), Teflon® (polytetrafluoroethylene, or PTFE), and combinations of two or more of the foregoing. FIG. 3 also illustrates central portions 306 of primary light beams 140 (FIG. 1B) emitted from respective optical waveguides 160, similar to the example of FIG. 2. One or more of the corresponding light sources 132 may be adjusted to adjust the color of the output light 170 as described above.

Figure 4:
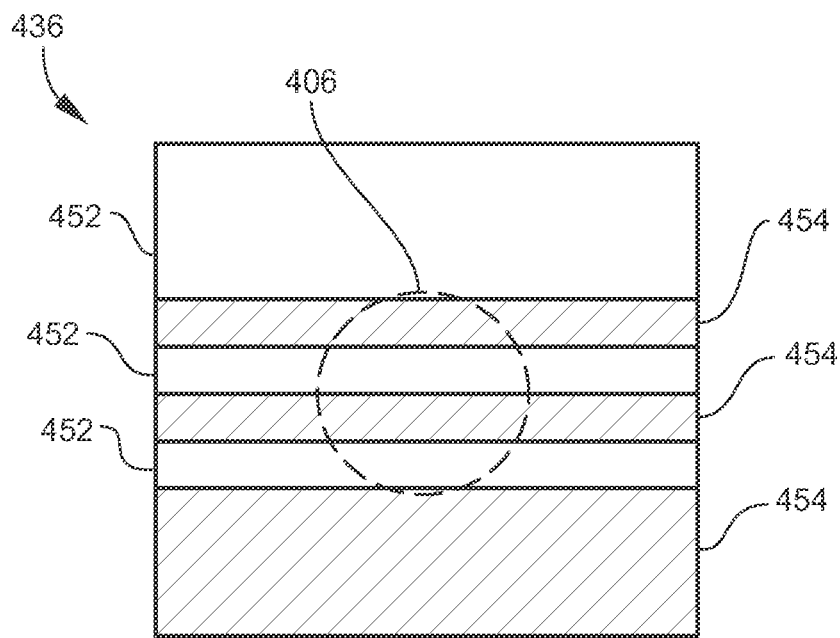
FIG. 4 is a plan view of another example of a light converter according to the present teachings.

FIG. 4 is a plan view of another example of a light converter 436 that may be utilized in conjunction with the lighting device 100 illustrated by example in FIGS. 1A and 1B or with other lighting devices. The light converter 436 is illustrated as having a rectilinear shape as an alternative to a rounded shape such as shown in FIGS. 2 and 3. The light converter 436 includes a pattern of different PL materials. In this example, the pattern is an alternating series of horizontally-oriented stripes or bars of first PL materials 452 (e.g., green emitters) and second PL materials 454 (e.g., red emitters). In this context, "horizontal" is relative to the view of FIG. 4, it being understood that the stripes could be vertical or obliquely oriented depending on the frame of reference. FIG. 4 may represent the entire light converter 436. In this case, one or more primary light beams 140 may illuminate the entire pattern on the light converter 436 or separate regions of the pattern. Alternatively, FIG. 4 may represent one section of the light converter 436, with the remaining sections of the light converter 436 having the same pattern, one or more different patterns, or no pattern. As one example, FIG. 4 illustrates a central portion 406 of one primary light beam 140 irradiating the pattern. The components of the pattern, such as the stripes in the present example, may be sized such that the central portion 406 irradiates one or more first PL materials 452 and one or more second PL materials 454. If desired, the pattern may be configured and/or the optical waveguide 160 aimed such that the central portion 406 irradiates a greater proportion of the first PL materials 452 than the second PL materials 454, or vice versa. As evident in FIG. 4, the stripes or bands of PL materials 452, 454 do not all need to have the same cross-sectional areas. That is, the areas of one or more of the stripes may vary, with some stripes being larger than other stripes, which may facilitate configuring the lighting device 100 to produce a desired color of output light 170.

Figure 5:
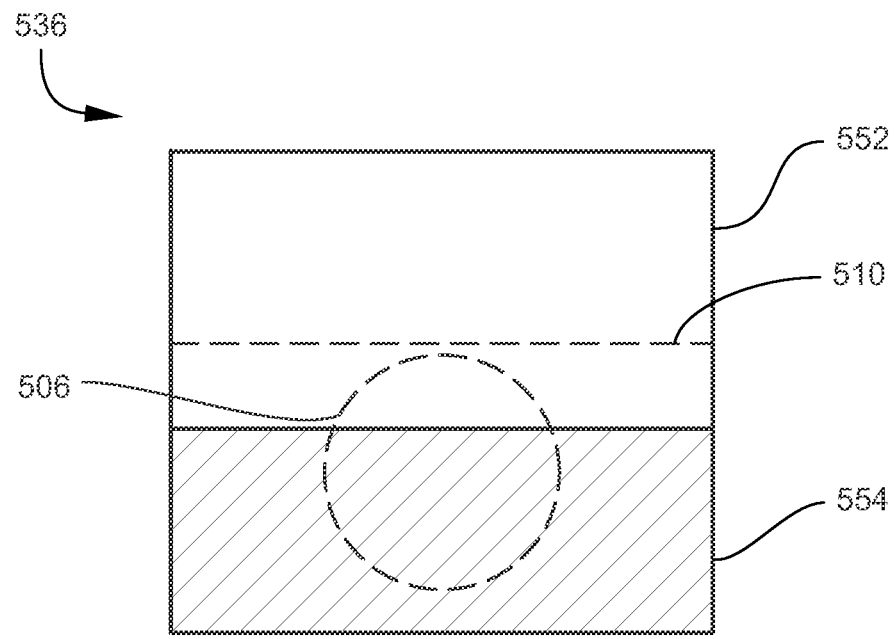
FIG. 5 is a plan view of another example of a light converter according to the present teachings.

FIG. 5 illustrates another example of a light converter 536 or portion of a light converter 536 that may be utilized in conjunction with the lighting device 100 illustrated by example in FIGS. 1A and 1B or with other lighting devices. In this implementation, the light converter 536 includes at least two physically separate sections (or segments, tiles, etc.) that respectively provide two different PL materials, i.e., a first PL material 552 (e.g., a green emitter) and a second PL material 554 (e.g., a red emitter). In the illustrated example, the first PL material 552 is positioned axially closer to the optical waveguide 160 relative to the second PL material 554 and overlaps a portion of the cross-sectional area of the second PL material 554. The overlapping relation is evident from a dashed line in FIG. 5 that designates an upper edge 510 of the second PL material 554. The optical waveguide 160 is aimed such that the primary light beam 140, again represented by a central portion 506 as described above, illuminates a greater fraction of the second PL material 554 than the first PL material 552. In a case where the first PL material 552 is a green emitter and the second PL material 554 is a red emitter, the illustrated configuration results in a greater proportion of secondary light being emitted at the red wavelength and, consequently, the output light 170 of the lighting device 100 exhibits a greater proportion of red color and has a lower CCT. Alternatively, these sections could be arranged such that a greater portion of the first PL material 552 (e.g., green emitter) overlaps the second PL material 554 (e.g., red emitter) and a greater fraction of the first PL material 552 is illuminated by the primary light beam 140. This would result in a greater proportion of secondary light being emitted at the green wavelength and, consequently, the output light 170 would exhibit a greater proportion of green color and may have a higher luminous efficacy.

More generally, any of the light converters disclosed herein may include an array of tiles instead of a single, contiguous structure. Each tile may present a different type of light emitter, and the tiles may be arranged in any desired pattern or sequence of different light emitters.

Figure 6:
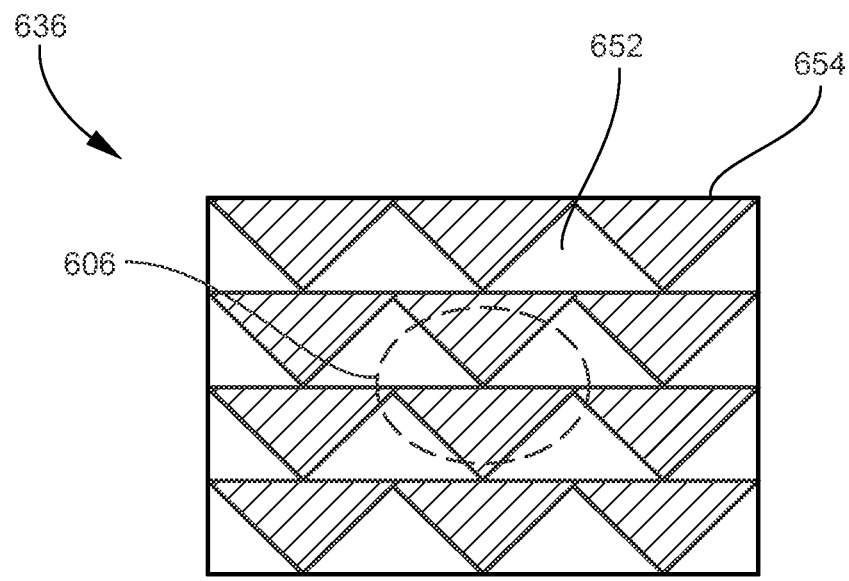
FIG. 6 is a plan view of another example of a light converter according to the present teachings.

FIG. 6 illustrates another example of a light converter 636 or portion of a light converter 636 that may be utilized in conjunction with the lighting device 100 illustrated by example in FIGS. 1A and 1B or with other lighting devices. In this implementation, the light converter 636 includes an alternating pattern of first PL materials 652 and second PL materials 654 (e.g., green emitters and red emitters). Specifically, the pattern comprises alternating stacks of triangles of first PL materials 652 and second PL materials 654. FIG. 6 also illustrates a central portion 606 of one primary light beam 140 irradiating the pattern in a manner in which portions of two or more triangular sections of first and second PL materials 652, 654 interact with the incident light. As in other implementations described herein, more than one light source 132 may be provided and thus more than one primary light beam (not shown) may illuminate the pattern illustrated in FIG. 6.

More generally, it will be appreciated that any polygonal shape (e.g., squares, rectangles, triangles, hexagons, trapezoids, diamonds, etc.) or rounded shape (e.g., ellipses, circles, dots, etc.) may be utilized with a light converter. Other examples include spirals and irregularly-shaped polygons as well as a pattern of dots or circles. Moreover, the pattern may include more than one type of shape. As examples, all first PL materials may have one shape while all second PL materials have a different shape, or some first and second PL materials may have one shape while other first and second PL materials have a different shape. Furthermore, not all members of a repeating set of shapes need to be the same size. For instance, in FIG. 6 some of the triangles may be one size while the other triangles are one or more different sizes.

Figure 7A:
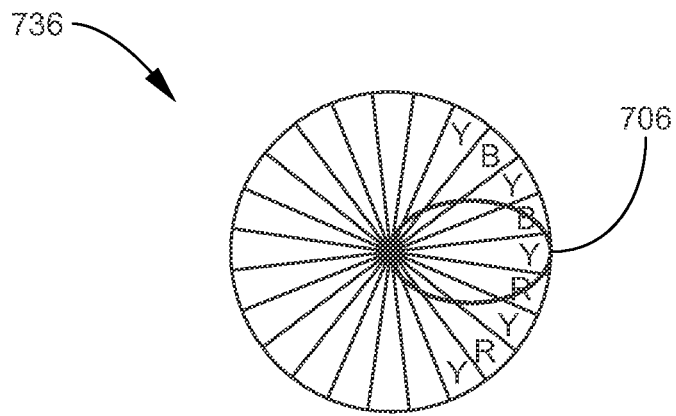
FIGS. 7A-7C are respective plan views of another example of a light converter according to the present teachings, illustrating a primary light beam incident on three different areas of the light converter.
Figure 7B:
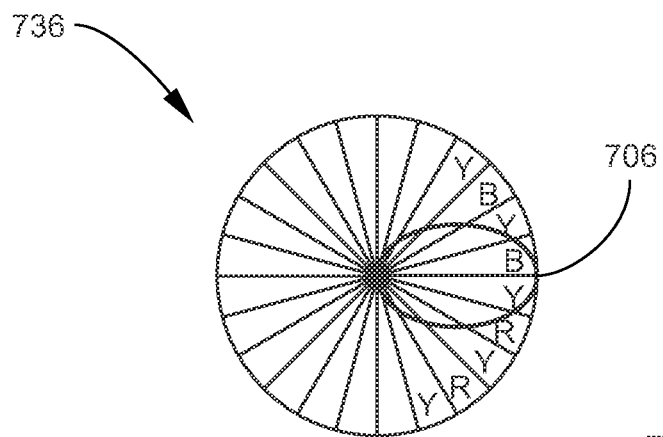
Figure 7C:
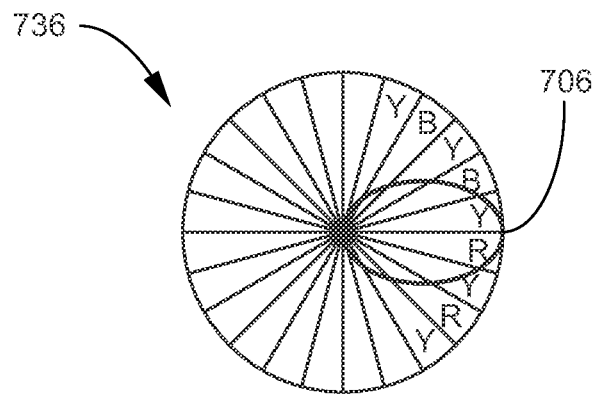

FIGS. 7A-7C are plan views of another example of a light converter 736 that may be utilized in conjunction with the lighting device 100 illustrated by example in FIGS. 1A and 1B or with other lighting devices. The light converter 736 includes a pattern of three different PL materials or a combination of PL materials and reflective materials. The pattern is an alternating array of circular sectors, with each circular sector containing a different PL material. The sequence of PL materials and the size of the circular sectors may depend on a number of factors, such as the intensity or irradiance of a central portion 706 of the primary light beam 140 on the PL materials, etc. In the illustrated example, the PL materials are designated "Y", "R" and "B". In a case where the lighting device 100 is intended to produce white output light 170, Y may represent a PL material providing the majority of secondary light utilized to balance the color of the primary light beam 140, R may represent a PL material providing secondary light in the long-wavelength part of the visible spectrum, and B may represent a PL material providing secondary light in the short-wavelength part of the visible spectrum. In the case of a blue light source 132, the Y material may be a yellow or green emitter, the R material may be a red, red-orange or orange emitter, and the B material may be a surface that reflects the blue excitation light (e.g., bare nanofibers or other type of reflective surface such as described above in conjunction with FIG. 3). Alternatively, the B material may be another PL material. As examples, in the case of a UV light source 132 (e.g., $\lambda_{em}$~350-370 nm) the B material may be a blue or violet emitter, and in the case of a violet light source 132 the B material may be a blue emitter. As another example, the light source 132 may be a UV emitter or a violet emitter (e.g., $\lambda_{em}$ ~408 nm), the Y material may be a green or yellow emitter, the R material may be a red or orange emitter, and a B material may be a blue emitter.

In any of foregoing cases, the optical waveguide 160 may be aimed so as to position the central portion 706 on a specific group of circular sectors as needed to obtain a desired color of output light 170. In one example in which white light is being produced, illumination of the group of sectors shown in FIG. 7A produces a neutral tone, illumination of the group of sectors shown in FIG. 7B produces a cool tone (more blue is reflected or emitted), and illumination of the group of sectors shown in FIG. 7C produces a warm tone (more red or other long-wavelength radiation is emitted).

In implementations where four light sources 132 and corresponding optical waveguides 160 are utilized, a pattern such as shown in FIGS. 7A-7C may be four-fold symmetric, with each primary light beam 140 aimed at a different quadrant of the pattern. For simplicity, only one primary light beam 140 (central portion 706) is illustrated in FIGS. 7A-7C. Alternatively, the light converter 736 may include four of the patterns illustrated in FIGS. 7A-7C, with one pattern in each quadrant and each primary light beam illuminating a different quadrant in a manner analogous to other implementations described above.

Figure 8:
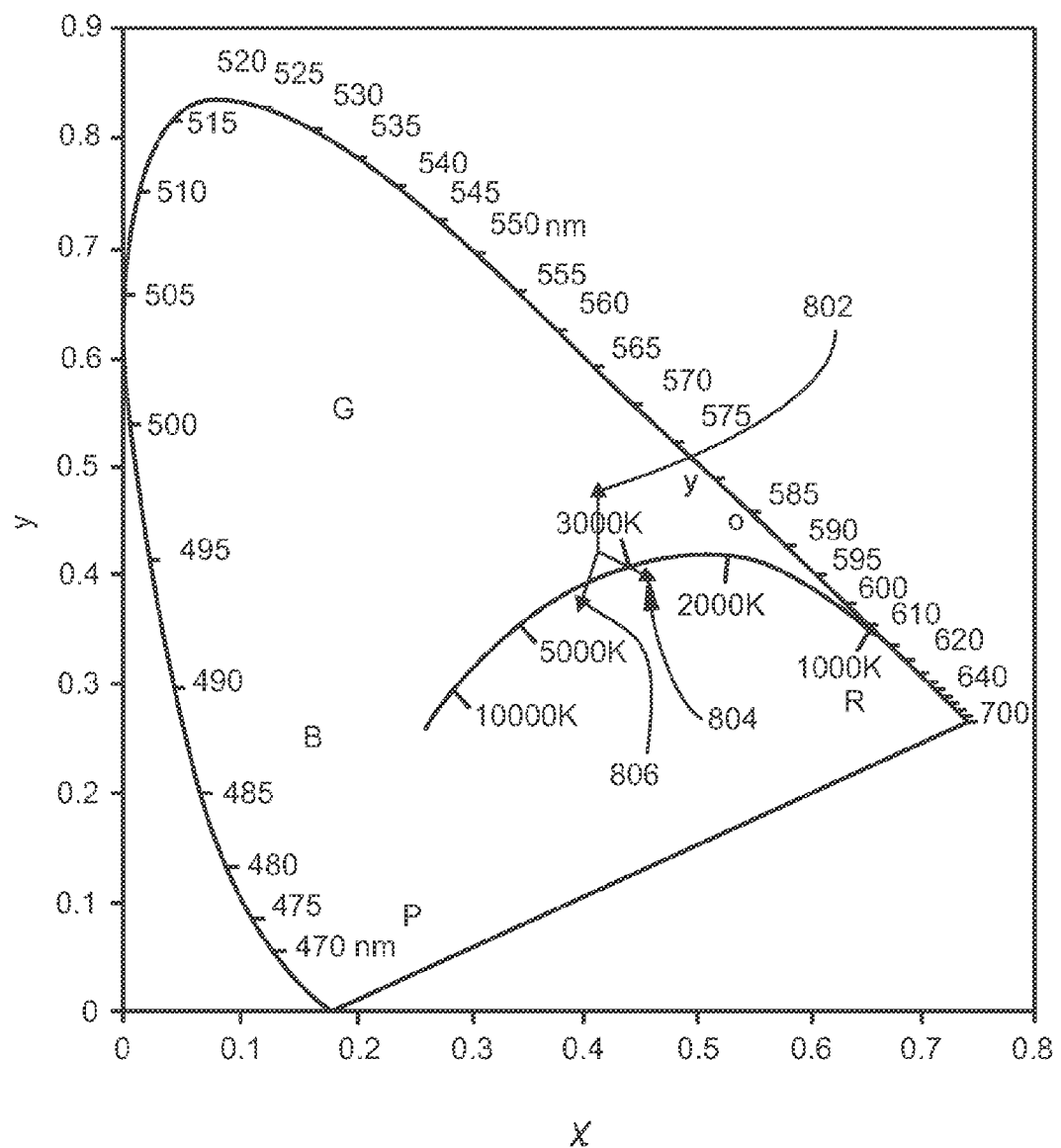
FIG. 8 is a representation of a CIE 1931 (x, y) chromaticity diagram illustrating how configuring lighting devices as disclosed herein can affect the color of the output light produced thereby.

FIG. 8 is a representation of a CIE 1931 (x, y) chromaticity diagram illustrating how fabricating a light converter according to implementations disclosed herein can affect the color of the output light produced by a lighting device utilizing the light converter. As appreciated by persons skilled in the art, the color space is bounded by the curved spectral locus shown in FIG. 8, which is indexed by wavelengths given in nanometers, and by the straight line that interconnects the two ends of the spectral locus. Red, green, blue, yellow, orange and purple regions of the color space are generally designated R, G, B, Y, O and P, respectively. The curved line in the color space is the Plankian locus, which is indexed by CCT values. For simplicity, isotherms (or lines of constant CCT) crossing the Plankian locus are not shown.

An arrow 802 in FIG. 8 illustrates the impact of adding a green-emitting material to the light converter (e.g., adding layers of green-emitting material, increasing the concentration of green-emitting material deposited, increasing the area of green-emitting material to be targeted by an excitation light beam, etc.). Increasing green emission typically results in increasing the y chromaticity coordinate of the resultant output light of the lighting device. Another arrow 804 illustrates the impact of adding a red-emitting material to the light converter. Increasing red emission decreases CCT and increases the x chromaticity coordinate. Another arrow 806 illustrates the impact of adding a reflective material such as a white material to the light converter in a case where the light source is a blue emitter. Equivalently, the arrow 806 illustrates the impact of adding a blue-emitting material responsive to a short-wavelength (UV or violet) light source. Either case increases blue emission, which increases CCT and decreases the x chromaticity coordinate. Various configurations entailing the use of two or more different types of luminescent materials and different patterns may be implemented to produce various other color tuning effects intermediate to the three examples just described. For a given configuration of a lighting device, the configuration of the luminescent materials of the light converter can be selected so as to move the properties of the output light toward the Plankian locus, which allows greater control over CCT, CRI, and (x,y) values. Movement of the chromaticity toward the Plankian locus may entail increasing or decreasing the x chromaticity coordinate and/or increasing or decreasing they chromaticity coordinate.

When evaluating the impact of a given configuration of the light converter, SPD data may be acquired and utilized to calculate CRI, CCT, chromaticity coordinates, and/or distance from Plankian locus. Spectral measurements may be acquired by utilizing, for example, a spectroradiometer or a tristimulus colorimeter. The calculations may be done according to predefined standards or guidelines such as those promulgated by CIE or other entities, or according to a manufacturer's specifications, a customer's requirements, or a user's preference. Some or all calculations may be done by executing one or more different types of computer software programs. Moreover, the light converter may be configured so as to yield a specific, desired value of one or more color parameters. The desired value may fall within a range of values deemed acceptable for the color sought for the output light of a lighting device being manufactured. For example, the range may be a range of error or tolerance about a single desired value of a given color parameter (e.g., ±1%).

In some implementations, a light converter may be fabricated by adding one or more PL materials to a surface (such as a substrate of the light converter) as a solution or ink that includes luminescent and/or reflective particles and one or more appropriate solvents. In the present context, for convenience the term "deposited" represents any technique for adding particles, whether by material transport (e.g., printing, coating via an applicator or dispenser instrument, etc.), immersion, self-assembly, etc. Depending on the types of particles to be deposited, the solvents may be organic or inorganic and may be polar or non-polar. The solution may also include any additives deemed appropriate or necessary, such as particle dispersants, surfactants, viscosifiers, agents that inhibit agglomeration or slumping, agents that control solution rheology, agents that promote adhesion to the target surface receiving the solution, agents that control wetting properties, agents that control the resolution of the pattern of the particles applied to the target surface, agents that facilitate the use of a particular dispensing device utilized to apply the solution to the target surface, and/or agents that control any other property of the solution deemed important. As a few specific but non-limiting examples, the additive BYK®-411 commercially available from BYK-Chemie GmbH, Germany may be added as a surfactant, and the alkyd Beckosol® 11-035 commercially available from Riechhold Inc., Durham, N.C. may be added as a dispersant. After deposition, the solution may be cured to form a stable, permanent layer of particles. Curing may be carried out in any manner suitable for the composition of the particles being deposited, such as, for example, air drying, heating, UV-curing, etc. Curing may entail the evaporation of excess volatile components, which may be assisted by vacuum.

Any dispensing technique suitable for the type of luminescent or reflective material, and which is non-destructive of the underlying component, may be utilized. Preferably, the dispensing technique is one that deposits particles uniformly on the underlying component. One or more of the additives noted above may also ensure uniform deposition. Examples of dispensing techniques include, but are not limited to, printing techniques, wet coating techniques, and dry coating techniques. Examples of printing techniques include, but are not limited to, ink-jet printing, digital printing, screen printing, thermal printing, transfer printing, etc. Examples of wet coating techniques include, but are not limited to, spray coating, dip coating, drop coating, spin coating, electrospray coating, doctor blading, deposition of Langmuir-Blodgett film, self-assembly of monolayers (SAMs) from liquid or vapor phase, etc. Examples of dry coating techniques include, but are not limited to, aerosol dry coating. Non-immersion techniques may utilize a suitable solution or ink dispensing apparatus (i.e., a dispenser or applicator) that may be manipulated manually or in an automated manner. Examples of dispensers include, but are not limited to, a syringe, a capillary, a printing pen, a printing pad or stamp, an ink-jet printing head, a spray nozzle, an electrospray needle, devices utilized in microfluidics, micro-total analysis, labs-on-a-chip, etc.

In some implementations, a coating that is or includes a surface treatment (or surface modifier) chemistry (a "surface treatment coating") may be applied to the target surface before depositing one or more layers of luminescent or reflective materials. The surface treatment coating may have a composition selected to control and improve adhesion, control wetting properties, and/or control pattern resolution (i.e., the pattern in which the particles are deposited on the underlying surface, as opposed to a pattern of sections of different types of particles). Examples of suitable surface treatment coatings include, but are not limited to, polyacrylates and polymers that can be deposited via chemical vapor deposition (CVD). In the case of a photoluminescent nanofiber (PLN) substrate, coatings that are optically transparent and do not expose the nanofibers to aggressive solvents that degrade the polymer fibers are acceptable. In more specific examples, poly(methyl methacrylate) (PMMA) and poly (lauryl methacrylate) (PLMA) have been found to be particularly suitable. The surface treatment coating may be deposited by any suitable technique. One or more of the deposition techniques noted above in conjunction with particle deposition may be suitable. The surface treatment coating may be deposited as a solution containing the component possessing the surface treating or modifying function (e.g., polyacrylates) and one or more suitable solvents such as, for example, toluene, hexane, etc. Non-fluorescent filler particles such as $TiO_2$, $SiO_2$, $Al_2O_3$ $CaCO_3$, bentonite and other clays may be utilized to increase the light reflectance and overall intensity of the PLN and control the degree of hide of the phosphor coating.

In some implementations, an ink-jet printer is utilized to deposit a solution of luminescent or reflective material on a target substrate or other component. One example of a suitable ink-jet printer is the Dimatix Materials Printer DMP-2800 commercially available from FUJIFILM Dimatix, Inc., Santa Clara, Calif. The ink-jet printer may include a frame at which the target substrate is mounted, a piezoelectric-driven ink-jet printhead, and an assembly of mechanical and motorized components configured to move the printhead in a controlled manner along one, two or three axes. The target substrate may be mounted on a platen (not shown) of the frame that is rotatable in a controlled manner. Either the frame or the printhead may allow adjustment of the vertical distance between the printhead and the target substrate. The printhead may include a reservoir for the particle solution and a bank of nozzles. The printhead is configured to form a layer or section of luminescent or reflective material of an accurately controlled size and shape. If desired, two or more sections of luminescent or reflective materials may be formed in any desired pattern. The particle solution may have a desired concentration of particles in the solvent (e.g., in the mg/ml range, such as 40 or 80 mg/ml). Various deposition (printing) parameters may be controlled such as number of jets firing, drop firing velocity (e.g., in the m/s range, such as 7 or 9 m/s, drop firing waveform (e.g., in the Hz range, such as 5 Hz), drop space (e.g., in the micron range, such as 25 µm), and drop size (e.g., in the picoliter range), etc.

In addition, the resolution at which the particle solution is printed and the deposition (printing) pattern may be controlled. Generally, particle solutions may be deposited in precisely metered aliquots or volumes, which may be characterized as deposition units. Each deposition unit may have a characteristic dimension (e.g., diameter, length, width, etc.) on the order of millimeters, microns, or fractions of an inch, and thus may contain a large quantity of particles. Moreover, the periodicity of or spacing between neighboring deposition units may also be controlled by controlling one or more the above-noted deposition parameters, and may also be on the order of millimeters, microns, or fractions of an inch. The deposition units may have any shape such as, for example, stripes, lines, circles, dots, ellipses, diamonds, other polygons, etc. As an example, the diameter or other characteristic dimension of the deposition unit may be 0.05 or 0.10 inch and the spacing between adjacent deposition units along a row or column may also be about 0.05 or 0.10 inch. A computer software program executed by hardware provided with or communicating with the ink jet printer may be utilized to control resolution and various other deposition parameters.

In some implementations, the luminescent/reflective materials or the entire light converter may be partially or fully encapsulated by any transparent encapsulant suitable for providing a protective barrier. Preferably, the encapsulant is UV-insensitive and not prone to thermal degradation. Examples of encapsulants include, but are not limited to, parylene, silicone (such as those available from Dow Corning of Midland, Mich.), and epoxies (such as those available from Norland Products of Cranbury, N.J.). The encapsulant may be deposited by any suitable technique. One or more of the deposition techniques noted above in conjunction with particle deposition may be suitable.

According to some implementations, the reflective materials and/or PL materials utilized in any of the lighting devices taught herein may be based on nanofiber substrates formed from a plurality of nanofibers. FIGS. 9A and 9B are schematic views of a nanofiber 908 or portion thereof. A plurality of such nanofibers 908 may be collected and formed into a nanofiber substrate. In some implementations, luminescent (or luminescent and reflective) particles may thereafter be applied to the nanofiber substrate in layers and/or sections as described above. Some particles 912 may be supported directly on outer surfaces of the nanofibers 908 as shown in FIG. 9B. In such implementations, these nanofibers 908 may be located at the substrate surface or also in an upper region of the nanofiber substrate. In some implementations, the average diameter of the luminescent particles 912 is smaller than the average diameter of the nanofiber 908.

In alternative implementations, certain particles 912 may be added to the nanofiber precursor and thus included with the as-formed nanofibers 908 to form a base PLN composite. In these implementations, FIG. 9A illustrates a case in which particles 912 are disposed in the bulk of the nanofiber 908, and FIG. 9B illustrates a case in which particles 912 are disposed on the nanofiber 908. In the present context, an arrangement of particles 912 "disposed on" the nanofiber 908 encompasses particles 912 disposed on an outer surface of the nanofiber 908, and/or particles 912 disposed at least partially in an outer region of the nanofiber 908 and protruding from the outer surface. When the particles 912 are luminescent and supported directly by nanofibers 908 as illustrated in FIG. 9A or 9B, the resulting fibers may be referred to as luminescent fibers or light-stimulable fibers.

Figure 10:
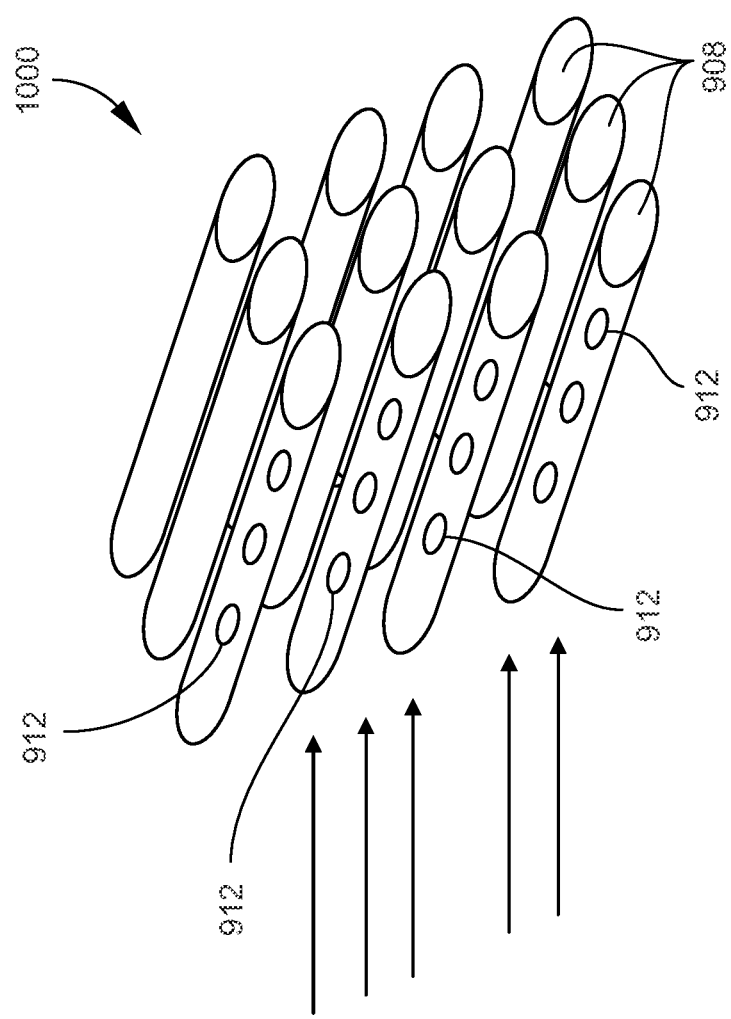
FIG. 10 is a schematic view of the nanofiber substrate formed with the fibers illustrated in FIG. 9A and/or FIG. 9B according to the present teachings.

FIG. 10 is a schematic view of an example of a nanofiber substrate 1000 (or portion of a nanofiber substrate 1000) formed from a plurality of nanofibers 908. The nanofiber substrate 1000 may be structured as a nonwoven mat. In some implementations, the nanofiber substrate 1000 may be considered as including one or more layers of nanofibers 908. When utilized as a PL material (a "PLN composite" or "PLN substrate"), the nanofiber substrate 1000 may support one or more layers of particles and/or may include luminescent fibers structured as shown in either FIG. 9A or FIG. 9B or a combination of both types of luminescent fibers shown in FIG. 9A and FIG. 9B.

As a bulk property, the nanofiber substrate 1000 may be considered to function as an optical scattering center for incident light. Light scattering from the nanofibers 908 is believed to depend on the wavelength $\lambda$ of the light, the diameter of the nanofibers 908, the orientation of the nanofibers 908 relative to the incident light, the surface morphology of the nanofibers 908, and the refractive index of the nanofibers 908. In some implementations, polymer nanofibers 908 have refractive indices ranging from 1.3 to 1.6. Incident light may be scattered by the nanofibers 908 and interact with particles 912 supported by the nanofiber substrate 1000 or incorporated with the nanofibers 908. Each nanofiber 908 may provide an individual scattering site for light incident thereon. Moreover, the nanofiber substrate 1000 may serve as a medium for effectively (and temporarily) capturing, trapping or confining photons of the incident light. These attributes increase the probability of interaction between the particles 912 and incident light. Hence, when utilized as a light converter or a color tuning material, the PLN substrates taught herein more efficiently capture excitation photons and re-radiate photons at visible wavelengths with higher intensities than would be possible with conventional, non-fibrous light converters. The superior performance of the nanofiber substrate 1000 over a comparative polymer solid film—both samples containing a uniform dispersion of the same type of luminescent QDs and an equal number of QDs—has been verified by testing as disclosed in U.S. Patent Application Pub. No. 2008/0113214.

In some examples, the nanofibers 908 of the nanofiber substrate 1000 may have an average fiber diameter ranging from 10 to 5,000 nm; in other examples ranging from 100 to 2,000 nm; in other examples ranging from 300 to 2,000 nm; and in other examples ranging from 400 to 1,000 nm. The nanofibers 908 may be fabricated such that their average fiber diameter is comparable to a wavelength λ of interest, such as that of the primary light emitted from a light source intended to irradiate the nanofiber substrate 1000. Sizing the nanofibers 908 in this manner helps to provide scattering sites within the structure of the nanofiber substrate 1000 for the primary light or other wavelength λ, of interest. For example, the wavelength 2 of interest may range from 100 to 2,000 nm, or in a more specific example may range from 400 to 500 nm (e.g., a blue-emitting light source), or may fall within the shorter wavelength ranges corresponding to violet and UV light sources. The nanofiber substrate 1000 may be more effective in capturing photons having the shorter wavelengths typically utilized for excitation in that, on average, shorter-wavelength light may propagate through the nanofiber substrate 1000 over a longer optical path length (OPL).

For example, a typical excitation wavelength is blue light at 450 nm. To produce white light, the lighting device would need to emit radiation over a broad range of wavelengths, for example from 450 nm to 750 nm. By fabricating a nanofiber substrate 1000 in which the average diameter of the nanofibers 908 is roughly the same as that of the excitation wavelength (e.g., 450 nm), the excitation light can be effectively trapped in the structure of the nanofiber substrate 1000 by light scattering (i.e., the OPL of the excitation light is long). This increases the likelihood that the excitation source will initiate fluorescence of the luminescent particles 912 on or in the nanofiber substrate 1000 sufficient to cause the lighting device to produce white light that is uniform and has a balanced spectral power distribution. In contrast to the excitation light, the longer wavelength emissions produced by fluorescence may be scattered less effectively by the nanofibers 908 and thus be more likely to emerge from the nanofiber substrate 1000 with minimal scattering. Under these conditions, the light scattering/photonic properties as a function of wavelength and fiber diameter are improved.

Figure 11:
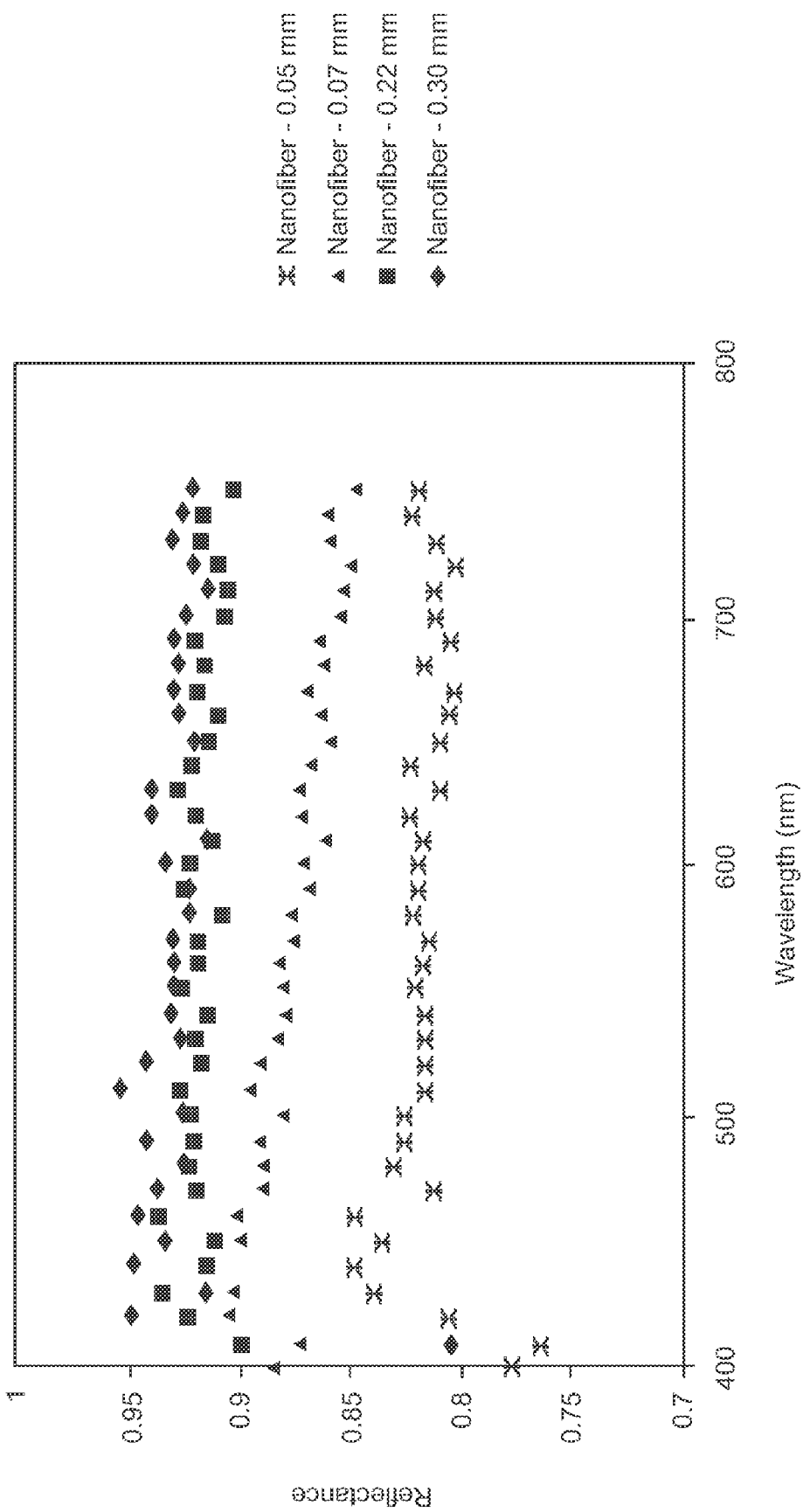
FIG. 11 provides reflectance data measured as a function of wavelength for four samples of nanofiber substrates of different thicknesses.

Additionally, the thickness of the nanofiber substrate 1000 may be selected to control the degree to which the nanofiber substrate 1000 is reflective of or (partially) transparent to light at wavelengths of interest. Generally, increasing thickness increases reflectivity and decreasing thickness increases transparency. In some examples, the thickness of the nanofiber substrate 1000 ranges from 0.1 to 2,000 μm. Thicknesses below 0.1 μm or above 2,000 μm are also encompassed by the present teachings, although an overly thin substrate 1000 may not be as effective at capturing incident excitation light while an overly thick substrate 1000 may promote too much scattering away from the particles 912. In other examples, the thickness of the nanofiber substrate 1000 ranges from 1 to 500 μm. In some implementations, a thickness of greater than 5 μm will render the nanofiber substrate 1000 sufficiently diffusively reflective of light over the range of visible wavelengths processed by the lighting devices taught herein (i.e., primary light, secondary light, and auxiliary light). In some examples, the nanofiber substrate 1000 reflects greater than 80% of visible light. In other examples, the nanofiber substrate 1000 reflects greater than 90% of visible light, and may reflect almost 100% of visible light. FIG. 11 provides reflectance data measured as a function of wavelength for four samples of nanofiber substrates of different thicknesses (0.05 mm, 0.07 mm, 0.22 mm, and 0.30 mm). FIG. 11 demonstrates that reflectance of relatively thick nanofiber substrates may approach or exceed 95% over a broad spectrum of wavelengths. On the other hand, at thicknesses less than 5 μm the nanofiber substrate 1000 may be transparent to visible light of various wavelengths to an appreciable degree.

The nanofiber substrate 1000 may be fabricated by a variety of techniques. In some implementations, the method entails forming nanofibers 908 of a controlled diameter by a technique such as electrospinning, extrusion, drawing, melt blowing, flash spinning, splitting/dissolving of bicomponent fibers, phase separation, solution spinning, template synthesis, or self-assembly. The method for fabricating the nanofiber substrate 1000 may be included as part of the methods described herein for fabricating color tuning materials and/or PL materials utilized as light converters.

In some advantageous implementations, the nanofibers 908 are formed by an electrospinning technique. As appreciated by persons skilled in the art, a typical electrospinning apparatus may generally include a source (e.g., reservoir) of a polymer solution or melt utilized as a precursor to the nanofibers 908. Various mixtures of polymers, solvents and additives may be utilized. The solvents may be organic or inorganic. Examples of solvents include, but are not limited to, distilled water, dimethylformamide, acetic acid, formic acid, dimethyl acetamide, toluene, methylene chloride, acetone, dichloromethane, combinations of the foregoing, one or more of the foregoing in combination with other solvents, or other suitable solvents. Additives may include viscosifiers, surfactants and the like. The polymer solution is flowed by any suitable means (e.g., a pump) to an electrospinning element (e.g., a head, needle, etc.). A positive electrode of a high-voltage power supply may be connected to the tip of the electrospinning element. The electrospinning element may be positioned at a specified distance from a metallic collector plate, which typically is electrically grounded. The electrospinning element and the collector plate may be located in a chamber configured to enable control over various processing conditions such as composition of gases, partial pressures, temperature, electrical field distribution, etc. With flow of the polymer solution at a specified flow rate established to the electrospinning element and a voltage of a specified magnitude applied to the electrospinning element, polymer nanofibers are drawn from the electrospinning element and accumulate as a nonwoven substrate on the collector plate. As appreciated by persons skilled in the art, the optimum operating parameters of the electrospinning apparatus (e.g., flow rate, voltage, distance between electrospinning element and collector plate, etc.) will depend on the composition of the nanofibers to be produced.

The general design, theory and operation of this type of electrospinning apparatus is known to persons skilled in the art and thus need not be described in detail herein. Some examples of suitable electrospinning apparatus and associated electrospinning-based techniques for forming nanofibers include those disclosed in U.S. Patent Application Pub. No. 2005/0224998; U.S. Patent Application Pub. No. 2005/0224999; U.S. Patent Application Pub. No. 2006/0228435; U.S. Patent Application Pub. No. 2006/0264140; U.S. Patent Application Pub. No. 2008/0110342; U.S. Patent Application Pub. No. 2008/0113214; International Pub. No. WO 2009/032378; and PCT Application No. PCT/US2010/031058.

In some implementations, electrospinning or other fiber-forming techniques may be utilized to produce a nanofiber substrate 1000 containing fibers of two or more average diameters. Fibers of different diameters may be mixed throughout the bulk of the nanofiber substrate 1000, or larger-diameter fibers may be located at one face of the nanofiber substrate 1000 while smaller-diameters are located at the opposite face. Fiber diameter may be graded through the thickness of the nanofiber substrate 1000.

In typical implementations, the nanofibers 908 of the nanofiber substrate 1000 are polymers. Examples of suitable polymers include, but are not limited to, acrylonitrile/butadiene copolymer, cellulose, cellulose acetate, chitosan, collagen, DNA, fibrinogen, fibronectin, nylon, poly(acrylic acid), poly(chloro styrene), poly(dimethyl siloxane), poly (ether imide), poly(ether sulfone), poly(ethyl acrylate), poly (ethyl vinyl acetate), poly(ethyl-co-vinyl acetate), poly(ethylene oxide), poly(ethylene terephthalate), poly(lactic acid-co-glycolic acid), poly(methacrylic acid) salt, poly(methyl methacrylate), poly(methyl styrene), poly(styrene sulfonic acid) salt, poly(styrene sulfonyl fluoride), poly(styrene-co-acrylonitrile), poly(styrene-co-butadiene), poly(styrene-co-divinyl benzene), poly(vinyl acetate), poly(vinyl alcohol), poly(vinyl chloride), poly(vinylidene fluoride), polyacrylamide, polyacrylonitrile, polyamide, polyaniline, polybenzimidazole, polycaprolactone, polycarbonate, poly(dimethylsiloxane-co-polyethyleneoxide), poly(etheretherketone), polyethylene, polyethyleneimine, polyimide, polyisoprene, polylactide, polypropylene, polystyrene, polysulfone, polyurethane, poly(vinylpyrrolidone), proteins, SEBS copolymer, silk, and styrene/isoprene copolymer.

Additionally, the nanofibers 908 may include a polymer blend. If electrospinning is to be implemented, the two or more polymers should be soluble in a common solvent or in a system of two or more appropriately selected solvents. Examples of suitable polymer blends include, but are not limited to, poly(vinylidene fluoride)-blend-poly(methyl methacrylate), polystyrene-blend-poly(vinylmethyl ether), poly(methyl methacrylate)-blend-poly(ethyleneoxide), poly (hydroxypropyl methacrylate)-blend-poly(vinylpyrrolidone), poly(hydroxybutyrate)-blend-poly(ethylene oxide), protein-blend-polyethyleneoxide, polylactide-blend-polyvinylpyrrolidone, polystyrene-blend-polyester, polyester-blend-poly(hyroxyethyl methacrylate), poly(ethylene oxide)-blend-poly(methyl methacrylate), and poly(hydroxystyrene)-blend-poly(ethylene oxide).

As noted above, in some implementations luminescent and/or reflective particles may be provided with the nanofibers 908 prior to the nanofiber substrate 1000 being formed. In this manner light-stimulable fibers are formed, which thereafter may be collected and formed into a light-stimulable nanofiber substrate 1000. In one implementation, the particles 912 may be applied (added) to the polymer solution supplied to the electrospinning apparatus and thus are discharged with the polymer matrix during electrospinning. The ratio of polymer to luminescent compound in the solution may typically range from 2:1 to 100:1. The large surface area of the nanofibers 908 may be sufficient to prevent agglomeration of the particles 912, although additional steps may be taken to inhibit agglomeration such as including de-agglomerating additives in the polymer/particle matrix, or other techniques disclosed in one or more of the references cited in the present disclosure. In another implementation, the particles 912 are applied to an as-forming nanofiber (which at this stage may be in the form of a liquid jet, filament, proto-fiber, etc.) while the nanofiber is being electrospun and/or coalescing into a resultant fiber mat or substrate 1000. In this case, the particles 912 may be transported to the as-forming nanofibers before they are dried by any suitable technique. In one advantageous implementation, a particle-inclusive solution is discharged from an electrospray apparatus positioned between the elecrospinning element and the collector plate. The position of the electrospray apparatus may be selected to control the extent of penetration of the particles 912 into the nanofiber 908, thereby dictating whether the particles 912 become embedded in the bulk of the nanofiber 908 (e.g., FIG. 9A) or disposed on the outer surface of the nanofiber 908 (e.g., FIG. 9B). The electrospray apparatus may be effective in inhibiting agglomeration of the particles 912.

In other implementations, the particles 912 are applied after electrospinning, i.e., after the nanofibers 908 have been formed into a nanofiber substrate 1000, by the various coating, printing and other methods described earlier in the present disclosure.

As noted previously, the particles 912 may be luminescent particles such as QDs, phosphors, nano-phosphors, organic dyes, or combinations of two or more of the foregoing. Reflective particles may also be included, such as barium sulfate, titanium (IV) oxide, alumina, zinc oxide, Teflon®, and combinations of two or more of the foregoing.

Examples of light-emitting QDs include, but are not limited to, silicon, germanium, indium phosphide, indium gallium phosphide, cadmium sulfide, cadmium selenide, lead sulfide, copper oxide, copper selenide, gallium phosphide, mercury sulfide, mercury selenide, zirconium oxide, zinc oxide, zinc sulfide, zinc selenide, zinc silicate, titanium sulfide, titanium oxide, and tin oxide. In certain specific examples, QDs found to be particularly suitable include CdSe, InGaP, InP, GaP, and ZnSe. More generally, the QDs are typically composed of inorganic semiconductor materials selected from various Group II-VI, Group Group III-V, Group IV, Group IV-VI, and Group V-VI materials. For some implementations, the QDs utilized may be selected from a class specified as being heavy metal-free (or restricted metal-free) QDs. Heavy metal-free QDs do not include heavy metals such as cadmium, mercury, lead, hexavalent chromium, or the like.

As other examples, QDs having the following compositions may be found to produce suitable secondary emissions of desired wavelengths in response to excitation of primary light of the wavelengths contemplated herein: Group II-VI materials such as ZnS, ZnSe, ZnTe, ZnO, CdS, CdSe, CdTe, CdO, HgS, HgSe, HgTe, HgO, MgS, MgSe, MgTe, MgO, CaS, CaSe, CaTe, CaO, SrS, SrSe, SrTe, SrO, BaS, BaSe, BaTe, and BaO; Group I-III-VI materials such as $CuInS_2$, $Cu(In,Ga)S_2$, $CuInSe_2$, and $Cu(In,Ga)Se_2$; Group III-V materials such as AlN, AlP, AlAs, AlSb, GaN, GaP, GaAs, GaSb, InN, InP, InAs, and InSb; Group IV materials such as Si, Ge, and C; Group IV-VI materials such as GeSe, PbS, PbSe, PbTe, PbO, SnSe, SnTe, and SnS; and Group V-VI materials such as $Sb_2Te_3$, $Bi_2Te_3$, and $Bi_2Se_3$. Transition metal compounds such as the oxides, sulfides, and phosphides of Fe, Ni, and Cu may also be applicable. Examples of QDs further encompass binary, ternary, quaternary, etc. alloys or compounds that include the foregoing species (e.g., SiGe, InGaAs, InGaN, InGaAsP, AlInGaP, etc.). Other QDs may include other types of semiconducting materials (e.g., certain organic and polymeric materials). For a QD having a core-shell structure, the shell may be composed of one of the foregoing species or other species, and the respective compositions of the core and the shell may be different. An example of a core-shell composition is CdSe—ZnS capped with organic ligands such as trioctylphosphine oxide (TOPO). Such core-shell structures are commercially available from Evident Technologies, Inc., Troy, N.Y.

As appreciated by persons skilled in the art, the composition selected for the QDs may be based on a desired property such as band gap energy or wavelength sensitivity. Moreover, the size or shape of the QDs may be selected to absorb or emit a desired wavelength of electromagnetic radiation when integrated with a nanofiber substrate or applied as a layer to other types of substrates. Generally for a given species of QD below a critical size, smaller sizes have larger band gaps and emit radiation at shorter (bluer) wavelengths while larger sizes have smaller band gaps and emit radiation at longer (redder) wavelengths. For example, CdSe nanoparticles of 2.8 nm nominal diameter emit green light at roughly 530 nm, whereas CdSe nanoparticles of 5.0 nm nominal diameter emit red light at roughly 625 nm. Additionally, the QDs utilized may include QDs of two or more different species (compositions) and/or two or more different specific sizes, as for example when fabricating a pattern of different PL materials. For example, a mixture or pattern of two or more different QDs may be selected so that the QDs emit different bands of visible electromagnetic radiation. Alternatively or additionally, more than one distinct QD layer or region of QDs may be provided, each having a different composition or size of QDs.

The QDs may be formed by various known techniques such as, for example, colloidal synthesis, plasma synthesis, vapor deposition, epitaxial growth, and nanolithography. The size, size distribution, shape, surface chemistry or other attributes of the QDs may be engineered or tuned to have desired properties (e.g., photon absorption and/or emission) by any suitable technique now known or later developed. In some implementations, QDs are provided in a solution of an organic carrier solvent such as anisole, octane, hexane, toluene, butylamine, etc., or in water, and with or without a matrix or host material, and are deposited to a desired thickness by any of the techniques disclosed herein. Alternatively, the QDs may be dispersed to a desired density or concentration in a matrix material, which may be composed of a polymer, sol-gel or other material that can easily form a film on the underlying target surface. Generally, the matrix material selected is one that does not impair luminescence or other desired performance parameters of the QDs.

Examples of phosphors and nano-phosphors include, but are not limited to, the following groups:

1. Rare-earth doped metal oxides such as $Y_2O_3$:Tb, $Y_2O_3$: $Eu^{3+}$, $Lu_2O_3$:$Eu^{3+}$, $CaTiO_3$:$Pr^{3+}$, CaO:$Er^{3+}$, (GdZn)O:$Eu^{3+}$, $Sr_4Al_{14}O_{25}$:$Eu^{3+}$, $GdMbB_3O_{10}$:$Ce^{3+}$:$Tb^{3+}$, and $CeMgAl_{11}O_{19}$:$Ce^{3+}$:$Tb^{3+}$;

2. Metal sulfides such as CaS:$Eu^{2+}$, $SrGa_2S_4$:Eu, and $Ca_wSr_xGa_y(S,Se)_z$:Eu such as those described in U.S. Pat. No. 6,982,045 and commercially available from PhosphorTech (Lithia Springs, Ga.);

3. Rare-Earth doped yttrium aluminum garnet (YAG) such as YAG:$Ce^{3+}$;

4. Metal silicates such as $Ca_3(Sc,Mg)_2Si_3O_{12}$:Ce (Ba,Sr)$_2$ $SiO_4$:Eu, and rare-Earth doped silicates including Eu-doped silicates;

5. Rare-earth doped zirconium oxide such as $ZrO_2$:$Sm^{3+}$ and $ZrO_2$:$Er^{3+}$;

6. Rare-earth doped vanadate ($YVO_4$:Eu) and phosphate (La, Ce,Tb)$PO_4$;

7. Doped materials consisting of a host matrix (e.g., $Gd_2O_3$, $GdO_2S$, PbO, ZnO, ZnS, ZnSe) and a dopant (Eu, Tb, Tin, Cu, Al and Mn); and 8. Metal-doped forms of zinc sulfide and zinc selenide (e.g., ZnS:$Mn^{2+}$, ZnS:$Cu^+$, $Zn_{0.25}Cd_{0.75}$S:AgCl).

Other examples of phosphors that may be suitable may be found in W. M. Yen, S. Shionoya, and H. Yamamoto, *Phosphor Handbook*, Second Ed., the entire contents of which are incorporated by reference herein. In certain specific examples, phosphors found to be particularly suitable include rare-earth doped YAG, doped metal sulfides including doped ZnS and doped $SrGa_2S_4$, doped ZnSe, and doped silicates such as those available from Internatix of Fremont, Calif.

Phosphors are typically provided in aqueous dispersions and may include a polymeric binder as well as any of the additives noted above. Generally, phosphors may be applied to underlying substrates or particle layers by employing the same coating, printing and other techniques as for QDs.

Examples of organic dyes include, but are not limited to, various proteins and small molecules that exhibit fluorescence; fluorophores, such as resonance dyes like fluoresceins, rhodamines; most 4,4'-difluoro-4-bora-3a,4a-diaza-s-indacenes (BODIPY dyes); most cyanines; and charge transfer dyes (emission from intramolecular charge transfer transitions) such as coumarins.

As described above, a PL material as taught herein may include a combination (e.g., a blend, pattern, etc.) of QDs, phosphors, nano-phosphors and/or dyes, including a distribution of different sized particles of one or more of the foregoing classes of luminescent materials, to provide secondary emission of two or more different wavelengths. For instance, a PL material may include green-emitting phosphors and red-emitting QDs. A combination of luminescent particles may be selected such that, in further combination with the wavelength of the portion of the primary light emitted by the light source that is included in the output light of the lighting device, the output light has a broad-spectrum composition of wavelengths approaching that of a blackbody radiator and accordingly characterized by a CRI value approaching 100.

The Table below provides some non-limiting examples of combinations of light sources and luminescent materials found to be suitable for producing white light in lighting devices such as those disclosed herein:

| Example | Light source | PL material |
|---|---|---|
| 1 | Blue LED, 450-460 nm | CdSe/ZnS core-shell QDs (Evident Technologies), particle diameter 2.6-3.2 nm, yellow emission, |
| 2 | Blue LED, 450-460 nm | CdSe/ZnSe core-shell QDs (Evident Technologies): particle diameter 2.4 nm, green emission; and particle diameter 5.2 nm, red emission |
| 3 | Violet LED, 408 nm | CdSe/ZnSe core-shell QDs (Evident Technologies) particle diameter 1.9 nm, blue emission; and particle diameter 2.4 nm, green emission; and particle diameter 5.2 nm, red emission |
| 4 | UV LED, 350-370 nm | CdSe/ZnSe core-shell QDs (Evident Technologies) particle diameter 1.9 nm, blue emission; and particle diameter 2.4 nm, green emission; and particle diameter 5.2 nm, red emission |
| 5 | Blue LED, 450-470 nm | Sulfoselenide phosphor (PhosphorTech Corp., Lithia Springs, GA), green emission; and Red-emitting QDs |
| 6 | Blue LED, 450-470 nm | Eu-doped silicate phosphor (Internatix Corp., Fremont, CA), green emission; and Red-emitting QDs |
| 7 | Blue LED, 450-470 nm | Ce-doped YAG phosphor (Internatix Corp., Fremont, CA), yellow emission; and Red-emitting QDs |

In general, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

For purposes of the present disclosure, it will be understood that when a layer (or film, region, substrate, component, device, or the like) is referred to as being "on" or "over" another layer, that layer may be directly or actually on (or over) the other layer or, alternatively, intervening layers (e.g., buffer layers, transition layers, interlayers, sacrificial layers, etch-stop layers, masks, electrodes, interconnects, contacts, or the like) may also be present. A layer that is "directly on" another layer means that no intervening layer is present, unless otherwise indicated. It will also be understood that when a layer is referred to as being "on" (or "over") another layer, that layer may cover the entire surface of the other layer or only a portion of the other layer. It will be further understood that terms such as "formed on" or "disposed on" are not intended to introduce any limitations relating to particular methods of material transport, deposition, fabrication, surface treatment, or physical, chemical, or ionic bonding or interaction. The term "interposed" is interpreted in a similar manner.

The following references contain subject matter related to the present subject matter, and each reference is incorporated by reference herein in its entirety: U.S. Patent Application Pub. No. 2005/0224998, filed on Apr. 8, 2004, titled "Electrospray/electrospinning Apparatus and Method;" U.S. Patent Application Pub. No. 2005/0224999, filed Apr. 8, 2004, titled "Electrospinning in a Controlled Gaseous Environment;" U.S. Patent Application Pub. No. 2006/0228435, filed on Apr. 8, 2004, titled "Electrospinning of Polymer Nanofibers Using a Rotating Spray Head;" U.S. Patent Application Pub. No. 2006/0264140, filed May 17, 2005 titled "Nanofiber Mats and Production Methods Thereof;" U.S. Patent Application Pub. No. 2008/0110342, filed Nov. 13, 2006, titled "Particle Filter System Incorporating Nanofibers;" U.S. Patent Application Pub. No. 2008/0113214, filed on Nov. 13, 2006, titled "Luminescent Device;" International Pub. No. WO 2009/032378, filed on Jun. 12, 2008, titled "Long-Pass Optical Filter Made from Nanofibers;" U.S. Provisional Patent Application No. 61/266,323, filed on Dec. 3, 2009, titled "Reflective Nanofibers in Lighting Devices;" PCT Application No. PCT/US2010/031058, filed on Apr. 14, 2010, titled "Stimulated Lighting Devices;" U.S. Provisional Patent Application titled. "Color-Tunable Lighting Devices and Methods for Tuning Color Output of Lighting Devices", filed concurrently with the present application; U.S. Provisional Patent Application titled "Photoluminescent Nanofiber Composites, Methods for Fabrication, and Related Lighting Devices,", filed concurrently with the present application; and U.S. Provisional Patent Application titled "Lighting Devices With Color-Tuning Materials and Methods for Tuning Color Output of Lighting Devices,", filed concurrently with the present application.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A lighting device, comprising:
a housing enclosing a housing interior and comprising a light exit for outputting a combination of primary light and secondary light;
a light converter comprising a luminescent material spaced from the light exit by a distance along an axial direction, and a reflective substrate comprising a plurality of nanofibers, wherein the luminescent material is supported by the substrate;
a light source mounted at the housing and configured for emitting a primary light beam of a primary wavelength; and
an optical waveguide comprising an input end optically coupled to the light source and an output end facing the housing interior and positioned at an angle to the axial direction, wherein the optical waveguide is configured for directing the primary light beam from the light source, through the housing interior and toward the luminescent material, and the luminescent material is configured for emitting secondary light of one or more wavelengths different from the primary wavelength in response to excitation by the primary light beam, and wherein the optical waveguide is selected from the group consisting of a light pipe, an optical fiber, a dielectric slab, a prism, a photonic crystal, a photonic-crystal fiber, a mirror, and combinations of two or more of the foregoing.

2. The lighting device of claim 1, wherein the housing comprises an inside housing surface enclosing the housing interior, the light source is mounted outside the housing interior, the optical waveguide extends through a bore of the inside housing surface, and the output end is located at the inside housing surface or at a position in the housing interior between the inside housing surface and the light converter.

3. The lighting device of claim 1, wherein the luminescent material comprises an inside luminescent surface facing the housing interior and oriented perpendicular to the axial direction.

4. The lighting device of claim 1, wherein the housing comprises a heat sink outside the housing interior and the light source is mounted at the heat sink.

5. The lighting device of claim 4, wherein the heat sink is located proximate to the light exit.

6. The lighting device of claim 1, wherein the light source is one of a plurality of light sources mounted at the housing and configured for emitting respective primary light beams, and the optical waveguide is one of a plurality of optical waveguides comprising respective input ends optically coupled to respective light sources and respective output ends positioned at respective angles to the axial direction, wherein the optical waveguides are configured for directing the respective primary light beams from the respective light sources, through the housing interior and toward the luminescent material.

7. The lighting device of claim 6, wherein the light sources and the optical waveguides are arranged circumferentially relative to the axial direction.

8. The lighting device of claim 6, wherein the housing comprises an annular structure disposed outside the housing interior, the annular structure comprises one or more heat sinks, and the light sources are mounted at the one or more heat sinks.

9. The lighting device of claim 6, wherein one or more of the optical waveguides are configured to illuminate substantially the entire luminescent surface, or to illuminate a portion of the luminescent surface.

10. The lighting device of claim 6, wherein one or more of the light sources comprise circuitry configured for adjusting an intensity of the corresponding primary light beam.

11. The lighting device of claim 6, wherein the light converter comprises a reflective section facing the housing interior, at least one of the optical waveguides is configured to direct a corresponding primary light beam to the reflective section, and at least one of the other optical waveguides is configured to direct a corresponding primary light beam to the luminescent material.

12. The lighting device of claim 6, wherein the luminescent material comprises a first luminescent section configured for emitting secondary light of a first wavelength, and a second luminescent section configured for emitting secondary light of a second wavelength different from the first wavelength, and at least one of the optical waveguides is configured to direct a corresponding primary light beam to the first luminescent section, and at least one of the other optical waveguides is configured to direct a corresponding primary light beam to the second luminescent section.

13. The lighting device of claim 1, wherein the luminescent material comprises a first luminescent component and a second luminescent component configured for respectively emitting secondary light of a first wavelength and a second wavelength, and the first luminescent component and the second luminescent component are arranged in an alternating pattern.

14. The lighting device of claim 13, wherein the alternating pattern is selected from the group consisting of a plurality of polygons, a plurality of ellipses, a plurality of circular sectors, a spiral pattern, a dot or circular pattern, and combinations of two or more of the foregoing.

15. The lighting device of claim 1, comprising a reflective surface facing the housing interior.

16. The lighting device of claim 15, wherein the housing comprises an inside surface and the reflective surface is disposed on the inside surface.

17. A method for producing output light from a lighting device, the method comprising:
  generating a plurality of primary light beams of a primary wavelength from a plurality of respective light sources mounted at a housing of the lighting device;
  transmitting the primary light beams from the light sources into a plurality of respective optical waveguides communicating with a housing interior enclosed by the housing, wherein the optical waveguides are selected from the group consisting of a light pipe, an optical fiber, a dielectric slab, a prism, a photonic crystal, a photonic-crystal fiber, a mirror, and combinations of two or more of the foregoing;
  emitting the primary light beams from the optical waveguides along respective nominal output axes oriented at respective angles to a central axis of the housing interior, wherein:
    the primary light beams are directed through the housing interior and at least a portion of the primary light beams are incident on a light converter comprising a luminescent material;
    the luminescent material comprises a first luminescent section configured to emit secondary light at a first wavelength and a second luminescent section configured to emit secondary light at a second wavelength different from the first wavelength; and
    at least one of the primary light beams predominantly illuminates the second luminescent section relative to the other primary light beams;
  emitting secondary light from the luminescent material through the housing interior, in response to excitation by the primary light beam, wherein the secondary light is emitted at one or more wavelengths different from the primary wavelength; and
  outputting output light from a light exit communicating with the housing interior, wherein the output light comprises a combination of primary light and secondary light.

18. The method of claim 17, wherein the light source is positioned outside of the housing interior and the primary light and secondary light propagate through the housing interior free of obstruction by the light source.

19. The method of claim 17, comprising adjusting a color of the output light by adjusting an intensity of the light source.

20. The method of claim 17, wherein:
  (a) the light converter comprises a plurality of sections facing the housing interior and having a configuration selected from the group consisting of: (i) a section of reflective material and a section of luminescent material; (ii) a section of a first luminescent material configured for emitting secondary light of a first wavelength, and a section of a second luminescent material configured for emitting secondary light of a second wavelength different from the first wavelength; and (iii) a section of reflective material, a section of a first luminescent material configured for emitting secondary light of a first wavelength, and a section of a second luminescent material configured for emitting secondary light of a second wavelength different from the first wavelength; and
  (b) the primary light beam is incident on one or more of the plurality of sections, and further comprising adjusting a color of the output light by adjusting an intensity of the light source.

21. The method of claim 17, comprising adjusting a color of the output light by adjusting an intensity of the primary light beam that predominantly illuminates the second luminescent section.

22. A lighting device, comprising:
  a housing enclosing a housing interior and comprising a light exit for outputting a combination of primary light and secondary light, and a heat sink outside the housing interior;
  a light converter comprising a luminescent material spaced from the light exit by a distance along an axial direction;
  a light source mounted at the heat sink and configured for emitting a primary light beam of a primary wavelength; and
  an optical waveguide comprising an input end optically coupled to the light source and an output end facing the housing interior and positioned at an angle to the axial direction, wherein the optical waveguide is configured for directing the primary light beam from the light source, through the housing interior and toward the luminescent material, and the luminescent material is configured for emitting secondary light of one or more wavelengths different from the primary wavelength in response to excitation by the primary light beam, and wherein the optical waveguide is selected from the group consisting of a light pipe, an optical fiber, a dielectric slab, a prism, a photonic crystal, a photonic-crystal fiber, a mirror, and combinations of two or more of the foregoing.

23. The lighting device of claim 22, wherein the light source is one of a plurality of light sources mounted at the housing and configured for emitting respective primary light beams, and the optical waveguide is one of a plurality of optical waveguides comprising respective input ends optically coupled to respective light sources and respective output ends positioned at respective angles to the axial direction, wherein the optical waveguides are configured for directing the respective primary light beams from the respective light sources, through the housing interior and toward the luminescent material.

24. The lighting device of claim 22, wherein the luminescent material comprises a first luminescent component and a second luminescent component configured for respectively emitting secondary light of a first wavelength and a second wavelength, and the first luminescent component and the second luminescent component are arranged in an alternating pattern.

25. The lighting device of claim 22, wherein the light converter comprises a reflective substrate and the luminescent material is supported by the substrate.

26. The lighting device of claim 25, wherein the substrate comprises a plurality of nanofibers.

* * * * *